United States Patent
Toda

(10) Patent No.: US 8,565,556 B2
(45) Date of Patent: Oct. 22, 2013

(54) IMAGE INTERPOLATION METHOD, IMAGE INTERPOLATION DEVICE, AND PROGRAM

(75) Inventor: Masato Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 882 days.

(21) Appl. No.: 12/665,766

(22) PCT Filed: Jul. 3, 2008

(86) PCT No.: PCT/JP2008/062061
§ 371 (c)(1),
(2), (4) Date: Dec. 21, 2009

(87) PCT Pub. No.: WO2009/005120
PCT Pub. Date: Jan. 8, 2009

(65) Prior Publication Data
US 2010/0195934 A1    Aug. 5, 2010

(30) Foreign Application Priority Data
Jul. 3, 2007   (JP) .................................. 2007-174823

(51) Int. Cl.
| | |
|---|---|
| *G06K 9/32* | (2006.01) |
| *G09G 5/00* | (2006.01) |
| *G09G 5/10* | (2006.01) |
| *H04N 11/20* | (2006.01) |
| *H04N 7/01* | (2006.01) |
| *H04N 5/44* | (2011.01) |
| *H04N 9/74* | (2006.01) |
| *H04N 3/223* | (2006.01) |
| *H04N 1/393* | (2006.01) |
| *H04N 1/46* | (2006.01) |

(52) U.S. Cl.
USPC ........... 382/300; 382/299; 345/660; 345/698; 348/561; 348/581; 348/582; 348/704; 348/441; 358/451; 358/525

(58) Field of Classification Search
None
See application file for complete search history.

(56) References Cited

U.S. PATENT DOCUMENTS

2005/0212961 A1 * 9/2005 Matsuzaki et al. ............ 348/452
2006/0176393 A1 * 8/2006 Fazzini ......................... 348/448

FOREIGN PATENT DOCUMENTS

| EP | 1578119 A2 | 9/2005 |
|---|---|---|
| EP | 1804492 A2 | 4/2007 |
| GB | 2422975 A | 8/2006 |
| JP | 4-355581 A | 12/1992 |
| JP | 2004072528 A | 3/2004 |
| JP | 2005293361 A | 10/2005 |
| JP | 2005341346 A | 12/2005 |

OTHER PUBLICATIONS

European search report in counterpart EP patent application 08777813.0, dated Apr. 10, 2012.
International Search Report for PCT/JP2008/062061 mailed Oct. 7, 2008.
G. De Haan, et al, "Deinterlacing—An Overview", Proceedings of the IEEE, vol. 86, No. 9, Sep. 1998. pages 1839-1857.

* cited by examiner

*Primary Examiner* — Randolph I Chu

(57) ABSTRACT

An image interpolation method obtains an image line pixel value between two adjacent image lines. The method acquires a luminance change of pixels of two image lines and decides a region of two image lines where only one portion similar to a part of the luminance change of one of the image lines exists in the luminance change of the other image line in the vicinity of the image to be interpolated. Then, among pixel sets located at the symmetric positions about the object image to be interpolated with respect to the pixel within the region, the set having the highest similarity is selected. By using the pixel value of the selected set, the pixel value of the pixel to be interpolated is decided.

21 Claims, 18 Drawing Sheets

| ORIGINAL BRIGHTNESS CHANGE PATTERN | BRIGHTNESS CHANGE INDEX ADDED TO RIGHT | BRIGHTNESS CHANGE INDEX ADDED TO LEFT | NEW BRIGHTNESS CHANGE PATTERN |
|---|---|---|---|
| 0 | 0 | 0 | 0 |
| 0 | 1 | 0 | 1 |
| 0 | 0 | 1 | 1 |
| 0 | 1 | 1 | 1 |
| 0 | -1 | 1 | 3 |
| . | . | . | . |
| . | . | . | . |
| . | . | . | . |
| 4 | 0 | 0 | 4 |
| 4 | -1 | -1 | 5 |

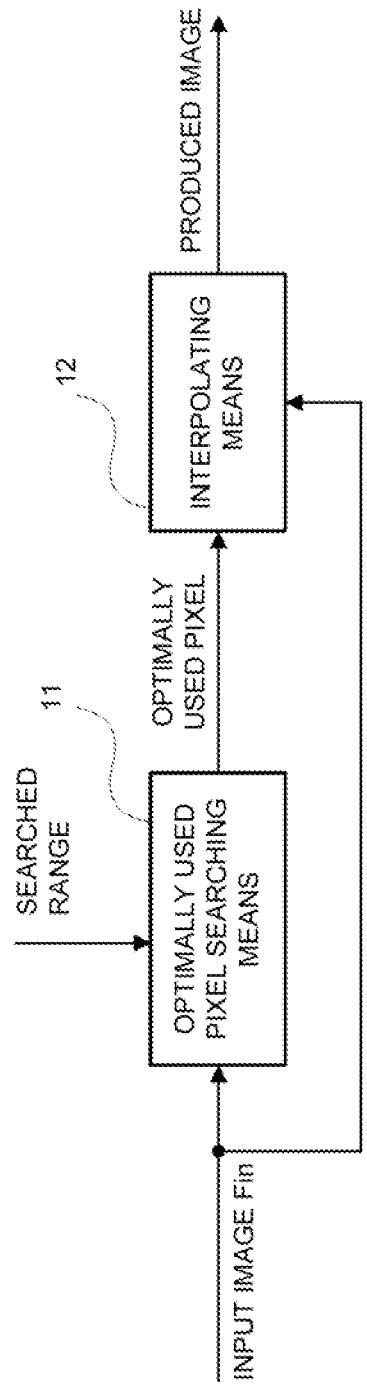

IMAGE INTERPOLATION METHOD, IMAGE INTERPOLATION DEVICE, AND PROGRAM

TECHNICAL FIELD

The present invention relates to an image interpolation method, an image interpolation apparatus, and a program.

BACKGROUND ART

When scaling up an image in a longitudinal direction, or converting an interlaced image into a progressive image, it is necessary to define an image Fin that has alternating lines, one having pixel values in a vertical direction and the other having no pixel value as given by EQ. (1), and interpolate Null's based on information on the lines having pixel values:

[Equation 1]

$$Fin(x, y) = \begin{cases} F(x, y) & \text{if } (y \bmod 2 = 0) \\ \text{Null} & \text{else} \end{cases} \quad \text{EQ. (1)}$$

or $$Fin(x, y) = \begin{cases} F(x, y) & \text{if}(y \bmod 2 = 1) \\ \text{Null} & \text{else} \end{cases}$$

where Fin(x, y) designates a value of Fin at coordinates (x, y).

One conventional interpolation method is an edge-adaptive interpolation method (Non-patent Document 1, Patent Document 1). The edge-adaptive interpolation method involves selecting a combination of pixels having a highest similarity from pairs of pixels on upper and lower lines that are point-symmetrical with respect to an interpolated pixel (x, y) and using the combination in interpolation, which can excellently reproduce oblique lines.

Now the conventional edge-adaptive interpolation method will be described with reference to FIG. 20. FIG. 20 is a block diagram showing a configuration of an image scaling-up apparatus using the conventional edge-adaptive interpolation method. The image scaling-up apparatus using the edge-adaptive interpolation method shown in FIG. 20 comprises optimally used pixel searching means 11 and interpolating means 12, and is supplied with an image Fin and a searched range as input and outputs an interpolated image.

The optimally used pixel searching means ills supplied with the image Fin and searched range as input, selects a pair of pixels having a highest similarity from pairs of pixels on upper and lower lines point-symmetric with respect to an interpolated pixel within the searched range (−φ−φ) for each interpolated pixel, and outputs optimally used pixel information indicating the positional relationship between the interpolated pixel and selected pair. FIG. 17 shows an explanatory diagram representing the summary of the processing at the optimally used pixel searching means 11. In the explanatory diagram of FIG. 17, an example of a searched range with φ=2 is used. First, (2φ+1) pairs of pixels point-symmetric with respect to an interpolated pixel are selected from a region delimited by a searched range specified for upper and lower lines of an interpolated pixel. The symbol 'p' in the drawing is a value representing a positional relationship between the interpolated pixel and a pixel pair. From the pixel pairs, one having a highest similarity is defined as optimally used pixels, and the value of 'p' for the selected pixel pair is output as optimally used pixel information 'k' Selection of a pair having a high similarity is implemented by a method of selecting a pixel pair that minimizes an evaluation function C1(p) of EQ. (2) or a method of selecting a pixel pair that minimizes an evaluation function C2(p) of EQ. (3). In Patent Document 2, the similarity is synthetically determined from a plurality of evaluation functions such as those of EQs. (2) and (3).

[Equation 2]

$$C1(p) = |Fin(x + p, y - 1) - Fin(x - p, y + 1)| \quad \text{EQ. (2)}$$

[Equation 3]

$$C2(p) = \sum_{q=-1}^{1} \left| \begin{array}{l} Fin(x + p + q, y - 1) - \\ Fin(x - p + q, y + 1) \end{array} \right| \quad \text{EQ. (3)}$$

The interpolating means 12 is supplied with the image Fin and optimally used pixel information as input, and outputs an interpolated image. An output pixel value FI(x, y, t) for an interpolated pixel (x, y) at coordinates (x, y) is calculated using optimally used pixel information k(x, y) at the interpolated pixel according to EQ. (4).

[Equation 4]

$$FI(x, y, t) = \frac{Fin(x + k(x, y), y - 1) + Fin(x - k(x, y), y + 1)}{2} \quad \text{EQ. (4)}$$

Patent Document 1: JP-P1992-355581A
Patent Document 2: JP-P2005-293361A
Non-patent Document 1: "Deinterlacing—an overview," De Haan, G., Beliefs, E. B, Proceedings of the IEEE, Vol. 86, Issue 9, September 1998, pp. 1839-1857

DISCLOSURE OF THE INVENTION

Problems to be Solved by the Invention

According to the conventional technique, edge-adaptive interpolation is applied using a searched range defined beforehand, which, however, arises a problem that degradation of image quality may occur because of difficulty in defining an appropriate searched range.

FIGS. 18 and 19 are explanatory diagrams showing the problem in the conventional technique. When an image as in FIG. 18 is supplied as input, edge-adaptive interpolation with φ=2 gives a result of interpolation having an unsharp edge, whereas edge-adaptive interpolation with φ=3 gives a result of interpolation having sharply reproduced edge. Thus, it is preferable to apply edge-adaptive interpolation with φ=3 to the input image as in FIG. 18. However, when an image as in FIG. 19 is input, edge-adaptive interpolation with φ=3 causes an optimally used pixel that is white and gives a result of interpolation having split black regions, whereas edge-adaptive interpolation with φ=2 results in no split in the black region, and therefore, it is preferable to apply edge-adaptive interpolation with φ=2.

Thus, according to the conventional technique, a searched range defined appropriately to improve quality of one image may lead to degradation in quality of the other image, and it is therefore difficult to define an appropriate searched range. For that reason, the conventional technique cannot provide an image interpolation apparatus that produces an interpolated image with high image quality.

The present invention has been made in view of such a problem, and its object is to provide an image interpolation method, an image interpolation apparatus, and a program that produce an interpolated image with high image quality.

Means to Solve the Problem

The present invention for solving the above-mentioned is an image interpolation method for determining, from two adjacent image lines, pixel values on an image line therebetween, comprising: acquiring brightness changes of pixels on said two image lines; determining a region of said two image lines in which only one portion similar to a portion of the brightness change on one image line is present in the brightness change on the other image line in proximity of said interpolated image; selecting a group of pixels within said region having a highest similarity from groups of pixels positioned symmetrically with respect to said interpolated pixel; and determining a pixel value of said interpolated pixel using pixel values of the selected group.

The present invention for solving the above-mentioned is an image interpolation method comprising: a brightness change index calculating step of calculating which one of indices a brightness change between adjoining pixels is ascribed to, said indices including flat, increasing and decreasing; a searched range calculating step of calculating a region in which brightness changes on two image lines increase or decrease in the same direction; an optimally used pixel searching step of selecting a group of pixels having a highest similarity from groups of pixels on image lines point-symmetric with respect to an interpolated pixel within the region; and an interpolating step of determining an interpolated value using the selected group having a highest similarity.

The present invention for solving the above-mentioned is an image interpolation method comprising: a brightness change index calculating step of calculating which one of indices a brightness change between adjoining pixels is ascribed to, said indices including flat, increasing and decreasing; a searched range calculating step of calculating a region in which brightness changes on two image lines increase or decrease in the same direction using information on a region calculated for an adjacent pixel on an interpolated line; an optimally used pixel searching step of selecting a group of pixels having a highest similarity from groups of pixels on image lines point-symmetric with respect to an interpolated pixel within the region; and an interpolating step of determining an interpolated value using the selected group having a highest similarity.

The present invention for solving the above-mentioned is an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, and one increasing or decreasing and the other convex; an optimally used pixel searching step of selecting a group of pixels having a highest similarity from groups of pixels on image lines point-symmetric with respect to an interpolated pixel within the region; and an interpolating step of determining an interpolated value using the selected group having a highest similarity.

The present invention for solving the above-mentioned is an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, one increasing or decreasing and the other convex, and increasing or decreasing in opposite directions; an optimally used pixel searching step of selecting a group of pixels having a highest similarity from groups of pixels on image lines point-symmetric with respect to an interpolated pixel within the region; and an interpolating step of determining an interpolated value using the selected group having a highest similarity.

The present invention for solving the above-mentioned is an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, and one increasing or decreasing and the other convex; an optimally used pixel searching step of selecting a group of pixels having a highest similarity from groups of pixels on image lines point-symmetric with respect to an interpolated pixel within the region by similarity calculation between increasing regions and between decreasing regions; and an interpolating step of determining an interpolated value using the selected group having a highest similarity.

The present invention for solving the above-mentioned is an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, one increasing or decreasing and the other convex, and increasing or decreasing in opposite directions; an optimally used pixel searching step of selecting a group of pixels having a highest similarity from groups of pixels on image lines point-symmetric with respect to an interpolated pixel within the region by similarity calculation between increasing regions and between decreasing regions; and an interpolating step of determining an interpolated value using the selected group having a highest similarity.

The present invention for solving the above-mentioned is an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, one increasing or decreasing and the other convex, and increasing or decreasing in opposite directions, using information on a region selected for an adjacent pixel on an interpolated line; an optimally used pixel searching step of selecting a group of pixels having a highest similarity from groups of pixels on image lines point-symmetric with respect to an interpolated pixel within the region by similarity calculation between increasing regions and between decreasing regions; an interpolating step of determining an interpolated value using the selected group having a highest similarity.

The present invention for solving the above-mentioned is an image interpolation apparatus for determining, from two adjacent image lines, pixel values on an image line therebetween, wherein: brightness changes of pixels on said two image lines is acquired; a region of said two image lines in which only one portion similar to a portion of the brightness change on one image line is present in the brightness change on the other image line in proximity of said interpolated image is determined; a group of pixels within said region having a highest similarity from groups of pixels positioned symmetrically with respect to said interpolated pixel are selected; and a pixel value of said interpolated pixel is determined using pixel values of the selected group.

The present invention for solving the above-mentioned is an image interpolation apparatus comprising: brightness change index calculating means for calculating which one of indices a brightness change between adjoining pixels is ascribed to, said indices including flat, increasing and decreasing; searched range calculating means for calculating a region in which brightness changes on two image lines increase or decrease in the same direction; optimally used pixel searching means for selecting a group of pixels having a highest similarity from groups of pixels on image lines point-symmetric with respect to an interpolated pixel within the region; and interpolating means for determining an interpolated value using the selected group having a highest similarity.

The present invention for solving the above-mentioned is an image interpolation apparatus comprising: brightness change index calculating means for calculating which one of indices a brightness change between adjoining pixels is ascribed to, said indices including flat, increasing and decreasing; searched range calculating means for calculating a region in which brightness changes on two image lines increase or decrease in the same direction using information on a region calculated for an adjacent pixel on an interpolated line; optimally used pixel searching means for selecting a group of pixels having a highest similarity from groups of pixels on image lines point-symmetric with respect to an interpolated pixel within the region; and interpolating means for determining an interpolated value using the selected group having a highest similarity.

The present invention for solving the above-mentioned is an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, and one increasing or decreasing and the other convex; optimally used pixel searching means for selecting a group of pixels having a highest similarity from groups of pixels on image lines point-symmetric with respect to an interpolated pixel within the region; and interpolating means for determining an interpolated value using the selected group having a highest similarity.

The present invention for solving the above-mentioned is an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, one increasing or decreasing and the other convex, and increasing or decreasing in opposite directions; optimally used pixel searching means for selecting a group of pixels having a highest similarity from groups of pixels on image lines point-symmetric with respect to an interpolated pixel within the region; and interpolating means for determining an interpolated value using the selected group having a highest similarity.

The present invention for solving the above-mentioned is an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, and one increasing or decreasing and the other convex; optimally used pixel searching means for selecting a group of pixels having a highest similarity from groups of pixels on image lines point-symmetric with respect to an interpolated pixel within the region by similarity calculation between increasing regions and between decreasing regions; and interpolating means for determining an interpolated value using the selected group having a highest similarity.

The present invention for solving the above-mentioned is an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, one increasing or decreasing and the other convex, and increasing or decreasing in opposite directions; optimally used pixel searching means for selecting a group of pixels having a highest similarity from groups of pixels on image lines point-symmetric with respect to an interpolated pixel within the region by similarity calculation between increasing regions and between decreasing regions; and interpolating means for determining an interpolated value using the selected group having a highest similarity.

The present invention for solving the above-mentioned is an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, one increasing or decreasing and the other convex, and increasing or decreasing in opposite directions, using information on a region selected for an adjacent pixel on an interpolated line; optimally used pixel searching means for selecting a group of pixels having a highest similarity from groups of pixels on image lines point-symmetric with respect to an interpolated pixel within the region by similarity calculation between increasing regions and between decreasing regions; interpolating means for determining an interpolated value using the selected group having a highest similarity.

The present invention for solving the above-mentioned is a program for image interpolation for determining, from two adjacent image lines, pixel values on an image line therebetween, wherein the program causes an information processing apparatus to execute the processing of:

acquiring brightness changes of pixels on said two image lines;

determining a region of said two image lines in which only one portion similar to a portion of the brightness change on one image line is present in the brightness change on the other image line in proximity of said interpolated image;

selecting a group of pixels within said region having a highest similarity from groups of pixels positioned symmetrically with respect to said interpolated pixel; and determining a pixel value of said interpolated pixel using pixel values of the selected group.

Effects of the Invention

An effect of the present invention is that it can achieve longitudinal scaling up and/or interlaced-to-progressive format conversion of an image with high image quality. The reason of this is that a portion to be handled is limited to one location by examining the brightness change around an interpolated pixel, and thus, a searched range is defined by an area involving no image quality degradation which would otherwise be encountered by selecting a different portion.

BRIEF DESCRIPTION OF THE DRAWINGS

FIG. 20 A block diagram showing a configuration of the conventional technique.

| [EXPLANATION OF SYMBOLS] | |
| --- | --- |
| 11 | Optimally used pixel searching means |
| 12 | Interpolating means |
| 23 | Brightness change index calculating means |
| 24 | Searched range calculating means |

BEST MODES FOR CARRYING OUT THE INVENTION

Now a first embodiment of the present invention will be described in detail with reference to the accompanying drawings.

Figure 1:
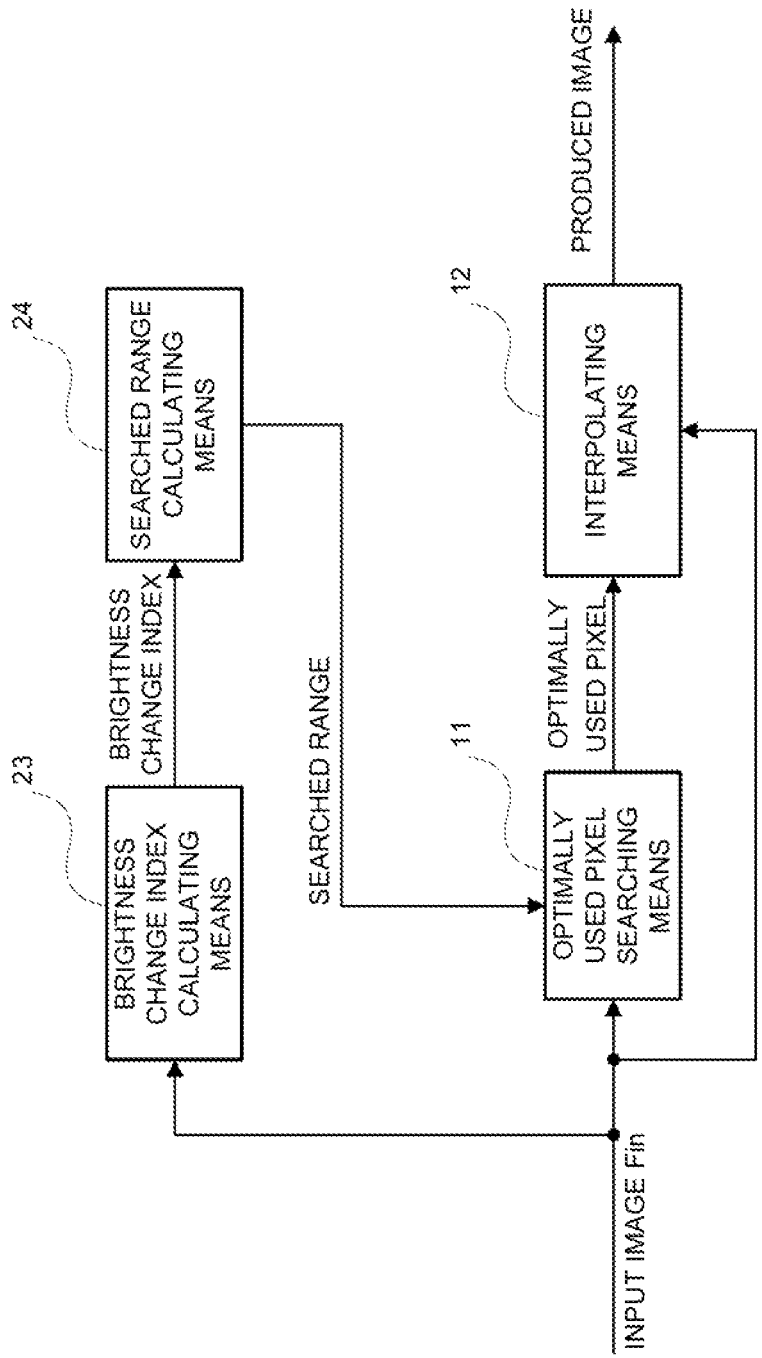
FIG. 1 A block diagram showing a configuration of the best mode for carrying out a first aspect of the present invention.

Referring to FIG. 1, the first embodiment in accordance with the present invention comprises optimally used pixel searching means 11, interpolating means 12, brightness change index calculating means 23, and searched range calculating means 24. The first embodiment of the present invention has a configuration similar to that of the conventional technique except that the brightness change index calculating means 23 and searched range calculating means 24 are added. An operation of the brightness change index calculating means 23 and searched range calculating means 24 will be described in detail hereinbelow.

The brightness change index calculating means 23 is supplied with an image Fin as input, and acquires a brightness change index that represents a brightness change between adjoining pixels on each line in the image Fin. The brightness change index is a value given as one when a brightness change increases between adjoining pixels, as minus one when it decreases, and as zero when it is flat. An example of a method of calculating a brightness index $D(x, y)$ between coordinates $(x, y)$ and coordinates $(x+1, y)$ in an image Fin is given as EQ. (5) below.

[Equation 5]

$$D(x, y) = \begin{cases} 1 & \text{if } ((Y(x+1, y) - Y(x, y)) > thres) \\ -1 & elseif ((Y(x+1, y) - Y(x, y)) < -thres) \\ 0 & \text{else} \end{cases} \quad \text{EQ. (5)}$$

where $Y(x, y)$ designates a brightness value at coordinates $(x, y)$ in the image Fin, and 'thres' is a predefined threshold.

Figure 2:
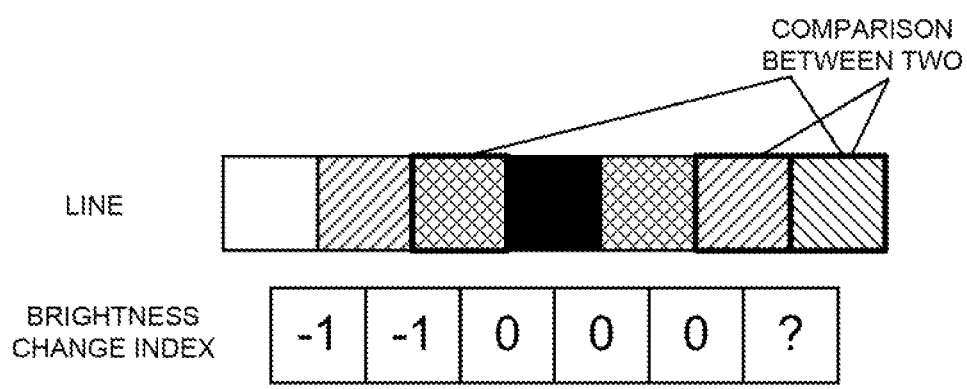
FIG. 2 An explanatory diagram for calculation of a brightness change index.

The brightness change index may also be acquired using a difference from a pixel away from a pixel of interest by several pixels, in addition to that from an adjoining pixel. For example, there is a method of, when a brightness change index is sequentially calculated from the left along each line, and a brightness change index is to be acquired at a position of a pixel having a flat and consecutive brightness change index regarding a left-adjacent pixel as shown in FIG. 2, determining the brightness change index using a difference value from a left-adjacent pixel and that from a pixel immediately before the brightness change index becomes flat.

The searched range calculating means 24 is supplied with the brightness change index as input, and outputs a largest range in which the brightness changes on upper and lower lines increase or decrease in the same direction as a searched range for each interpolated pixel. In a case that all brightness change indices are one or zero, or minus one or zero in the searched range, the brightness changes on upper and lower lines in the searched range may be considered as increasing or decreasing in the same direction. Then, the searched range calculating means 24 examines the brightness change index in a searched range $(-\phi(x, y)-\phi(x, y))$ for an interpolated pixel $(x, y)$ starting from an initial value of $\phi(x, y)=0$ and incrementing $\phi(x, y)$ by one to acquire a largest range. The following description will be made on an example of the method of calculating a searched range.

<Processing 1>

As an initial value, the value of $\phi(x, y)$, and the numbers DInc and DDec of brightness change indices having a value of one (increasing) and minus one (decreasing) in the searched range are set to zero.

<Processing 2>

The searched range is expanded by one pixel each to the right and left, and the values of DInc and DDec are updated. A method of updating DInc and DDec in expanding the searched range $(-\phi(x, y)-\phi(x, y))$ by one pixel each to the right and left includes a method of increasing DInc and DDec based on four brightness gradient index values of $D(x+\phi(x, y), y-1)$, $D(x-\phi(x, y)-1, y-1)$, $D(x+\phi(x, y), y+1)$, and $D(x-\phi(x, y)-1, y+1)$.

<Processing 3>

If a product of DInc and DDec is greater than zero, $\phi(x, y)$ is output and the process is terminated. Otherwise, $\phi(x, y)$ is incremented by one.

<Processing 4>

Processing 2 and Processing 3 are repeated until $\phi(x, y)$ is output and the process is terminated, whereby a largest range in which brightness changes on upper and lower lines increase or decrease in the same direction is acquired as a searched range. Alternatively, $\phi(x, y)$ may be output and the process may be terminated when $\phi(x, y)$ reaches a predefined largest range.

Figure 3:
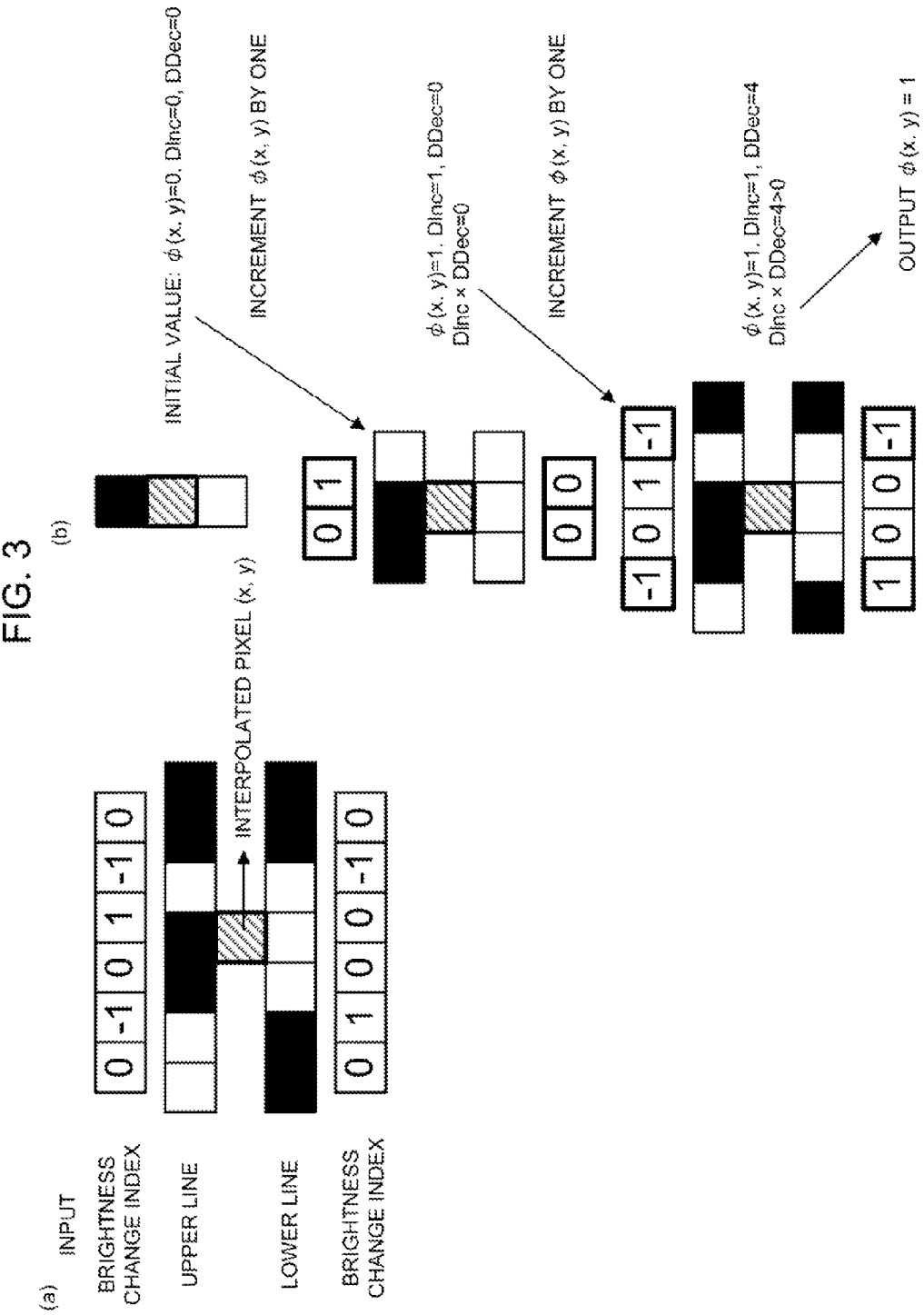
FIG. 3 An explanatory diagram for calculation of a searched range.

For example, a searched range for an interpolated pixel $(x, y)$ shown in FIG. 3(*a*) is $\phi(x, y)=1$ according to the processing shown in FIG. 3(*b*).

Figure 4:
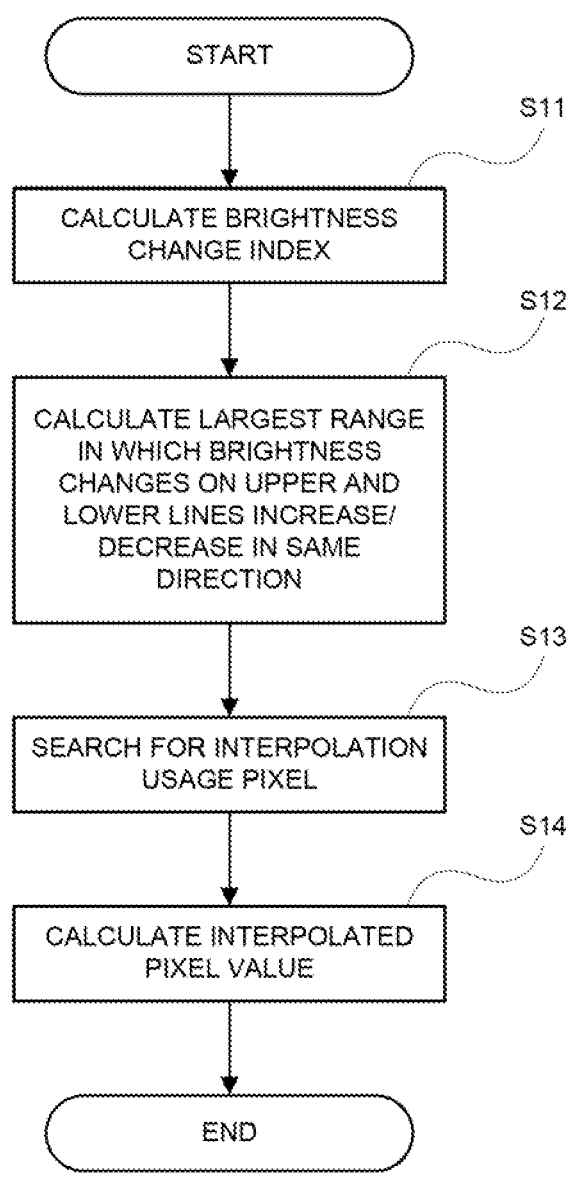
FIG. 4 A flow chart showing an operation of the best mode for carrying out the first aspect of the present invention.

Next, an overall operation of the present embodiment will be described in detail with reference to FIG. 1 and a flow chart in FIG. 4.

The brightness change index calculating means 23 calculates a brightness change index representing a brightness change between adjoining pixels for each line in an image Fin (Step S11).

The searched range calculating means 24 calculates a largest range in which the brightness changes on upper and lower lines increase or decrease in the same direction as a searched range for each interpolated pixel (Step S12).

The optimally used pixel searching means 11 acquires a pair of pixels having a highest similarity on upper and lower lines point-symmetric with respect to the interpolated pixel within the searched range for each interpolated pixel (Step S13).

The interpolating means 12 uses the optimally used pixels to calculate an interpolated pixel value for each interpolated pixel, and produces a progressive image (Step S14).

Now a second embodiment of the present invention will be described in detail with reference to the accompanying drawings.

Figure 5:
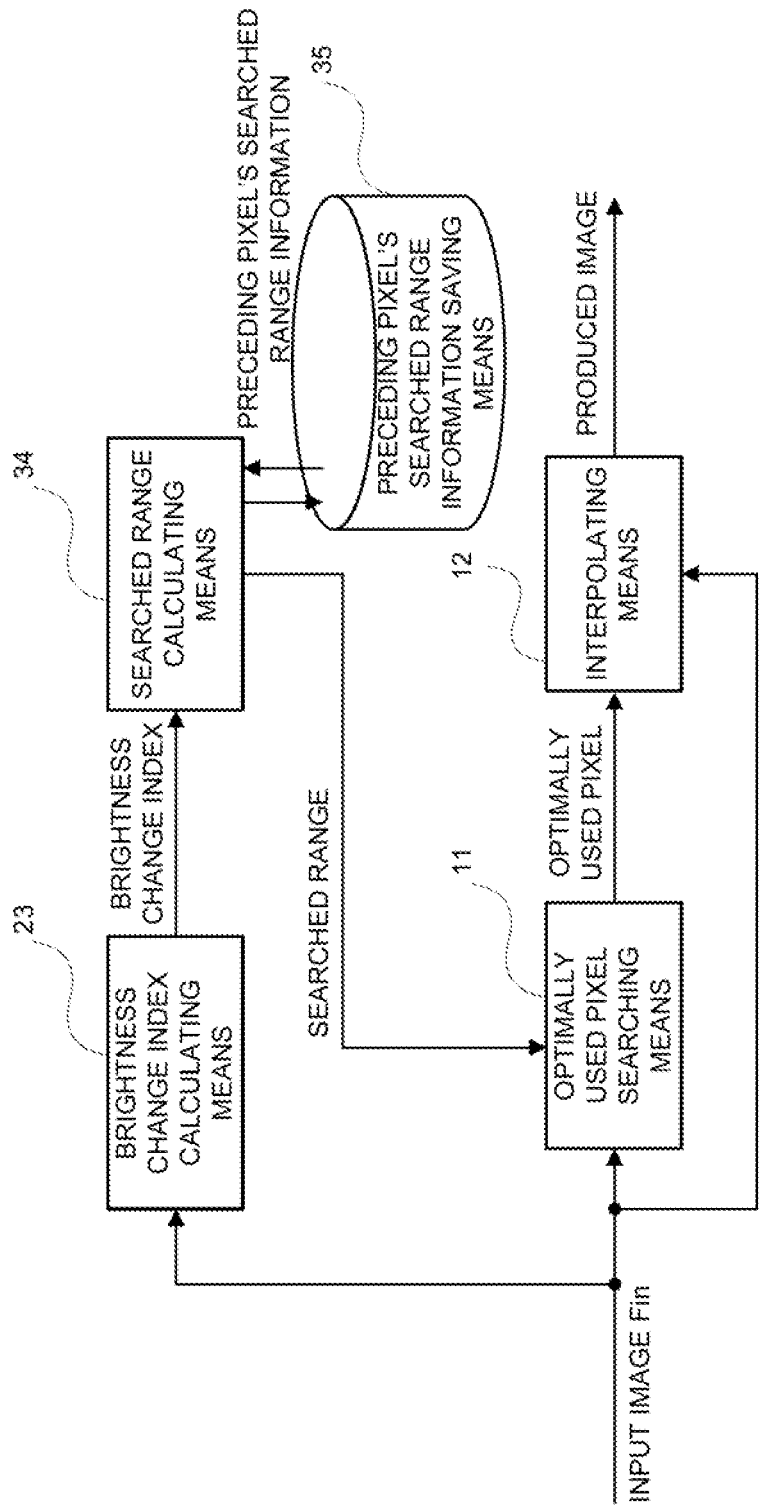
FIG. 5 A block diagram showing the best mode for carrying out a second aspect of the present invention.

Referring to FIG. 5, the second embodiment of the present invention comprises optimally used pixel searching means 11, interpolating means 12, brightness change index calculating means 23, searched range calculating means 34, and preceding pixel's searched range information saving means 35.

The second embodiment of the present invention is similar to the first embodiment of the present invention except that, at the searched range calculating means 34, information on a searched range acquired for a certain interpolated pixel and brightness changes in that searched range is recorded in the preceding pixel's searched range information saving means 35 for use in calculation of a searched range for another interpolated pixel. The operation of the searched range calculating means 34 will be described in detail hereinbelow.

Figure 6:
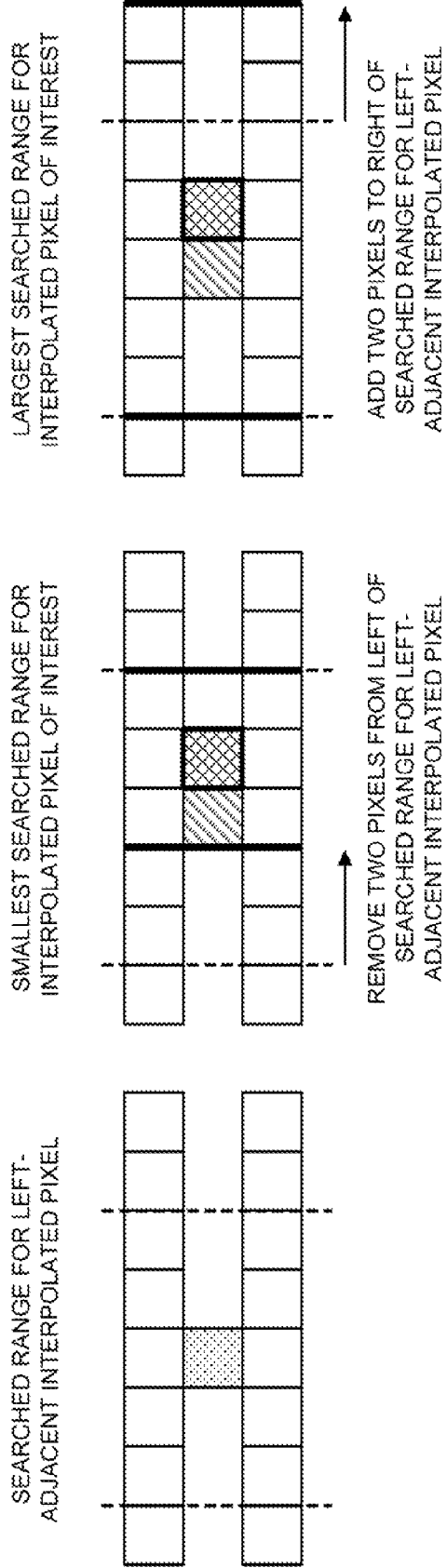
FIG. 6 An explanatory diagram showing a relationship between a searched range for an interpolated pixel and that for a left-adjacent interpolated pixel.

The searched range calculating means 34 is supplied with a brightness change index as input, sequentially calculates a searched range for each interpolated pixel starting from the left edge, and outputs it for each interpolated line. As shown in FIG. 6, a searched range for an interpolated pixel $(x, y)$ may be limited to any range from a smallest one coinciding with a right edge of a searched range for a left-adjacent interpolated pixel $(x-1, y)$ to a largest one coinciding with a left edge of the searched range for the interpolated pixel $(x-1, y)$. These candidate ranges are obtained by adding one or two pixel(s) to the right edge of the searched range for the left-adjacent interpolated pixel $(x-1, y)$ or removing one or two pixel(s) from the left edge thereof. For that reason, whether brightness changes on upper and lower lines increase or decrease in the same direction in each candidate range may be decided by incorporating the value of the brightness change index of the pixel(s) added to the right edge and removed from the left edge into the number DInc$(x-1, y)$ of one's (increasing) and the number DDec$(x-1, y)$ of minus one's (decreasing) of the brightness change index within the searched range for the interpolated pixel $(x-1, y)$.

Then, the searched range calculating means 34 records the acquired searched range, and the number of one's (increasing) and the number of minus one's (decreasing) for the brightness change index within that searched range into the preceding pixel's searched range information saving means 35 as preceding pixel's searched range information, and when acquiring a searched range for a right-adjacent interpolated pixel, it acquires a largest range by reading the recorded information and using the read information to decide settings of the candidate searched ranges and decide whether each candidate meets a condition that the brightness changes on upper and lower lines increase or decrease in the same direction, and outputs the result as a searched range.

Figure 7:
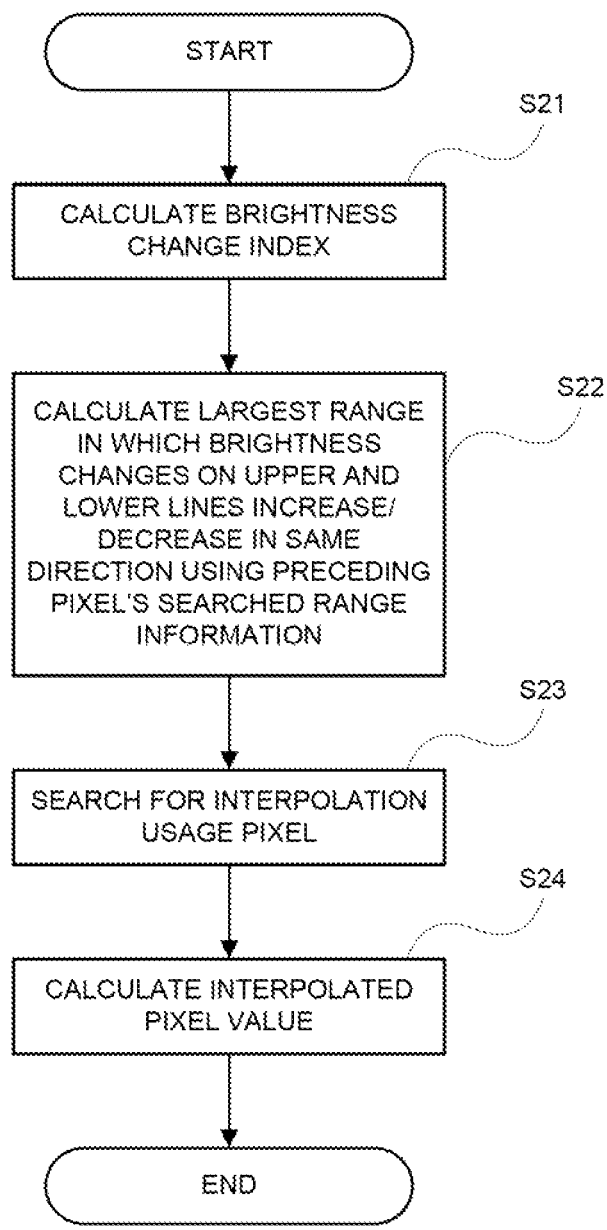
FIG. 7 A flow chart showing an operation of the best mode for carrying out the second aspect of the present invention.

Next, an overall operation of the present embodiment will be described in detail with reference to FIG. 5 and a flow chart in FIG. 7.

The brightness change index calculating means 23 calculates a brightness change index representing a brightness change between adjoining pixels for each line in the image Fin (Step S21).

The searched range calculating means 34 uses preceding pixel's searched range information to calculate a largest range in which the brightness changes on upper and lower lines increase or decrease in the same direction as a searched range for each interpolated pixel (Step S22).

The optimally used pixel searching means 11 acquires a pair of pixels having a highest similarity on upper and lower lines point-symmetric with respect to the interpolated pixel within the searched range for each interpolated pixel (Step S23).

The interpolating means 12 uses the optimally used pixels to calculate an interpolated pixel value for each interpolated pixel, and produces a progressive image (Step S24).

Now a third embodiment of the present invention will be described in detail with reference to the accompanying drawings.

Figures 8, 9:
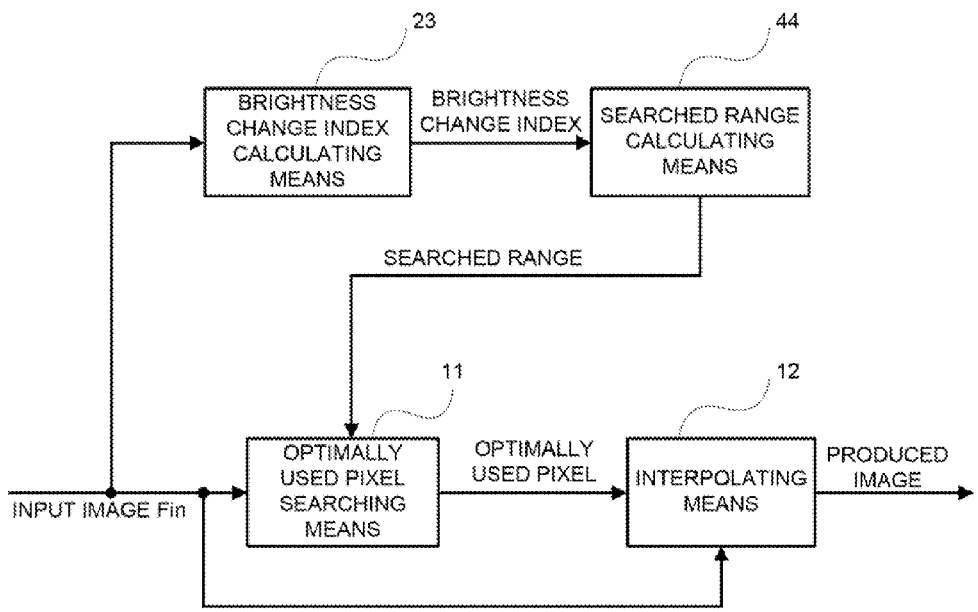
FIG. 8 A block diagram showing a configuration of the best mode for carrying out a third aspect of the present invention.
FIG. 9 An explanatory diagram showing a table for acquiring a brightness change pattern.

Referring to FIG. 8, the third embodiment in accordance with the present invention comprises optimally used pixel searching means 11, interpolating means 12, brightness change index calculating means 23, and searched range calculating means 44. The third embodiment in accordance with the present invention is similar to the first embodiment of the present invention except an operation of the searched range calculating means 44. The operation of the searched range calculating means 44 will be described in detail hereinbelow.

The searched range calculating means 44 is supplied with a brightness change index as input, and outputs a largest range in which brightness changes on upper and lower lines meet any one of the following three conditions as a searched range for each interpolated pixel.

(1) First condition: Increasing or decreasing in the same direction, (2) Second condition: Convex in the same direction, and (3) Third condition: One convex and the other increasing or decreasing.

The searched range calculating means 44 acquires a brightness change pattern on each of upper and lower lines in a searched range $(-\phi(x, y)\ y))$ for an interpolated pixel $(x, y)$ starting from an initial value of $\phi(x, y)=0$ and incrementing $\phi(x, y)$ by one, and decides whether it meets any one of these three conditions to acquire a largest range. The brightness change pattern is a value given as zero when a brightness change is flat within a designated range, one when the change monotonically increases, two when the change monotonically decreases, three when the change is upwardly convex, four when the change is downwardly convex, or otherwise, five, and the pattern may be acquired by sequentially examining the value of the brightness change index within the designated range, as shown in FIG. 9.

The following description will be made on an example of the method of calculating a searched range.

<Processing 1>

As an initial value, the values of $\phi(x, y)$, and upper and lower brightness change patterns TPat and BPat in the searched range are set to zero.

<Processing 2>

The searched range is expanded by one pixel each to the right and left, and the values of TPat and BPat are updated. A method of updating TPat and BPat in expanding the searched range $(-\phi(x, y)-\phi(x, y))$ by one pixel each to the right and left includes a method of using a table representing a relationship between an original brightness change pattern, brightness change indices for pixels added to the right and left, and a new brightness change pattern, as shown in FIG. 7.

<Processing 3>

If a combination of TPat and BPat meets any one of the three conditions described above, $\phi(x, y)$ is incremented by one and updated. If, for the combination of TPat and BPat, they increase or decrease in opposite directions, $\phi(x, y)$ is not updated but the process is continued. Otherwise, $\phi(x, y)$ is output and the process is terminated.

<Processing 4>

Processing 2 and Processing 3 are repeated until $\phi(x, y)$ is output and the process is terminated, whereby a largest range that meets any one of the three conditions described above is acquired as a searched range. Alternatively, $\phi(x, y)$ may be output and the process is terminated when $\phi(x, y)$ reaches a predefined largest range.

The searched range calculating means 44 may set a fourth condition for increasing or decreasing in opposite directions to update $\phi(x, y)$ at Processing 3.

Figure 10:
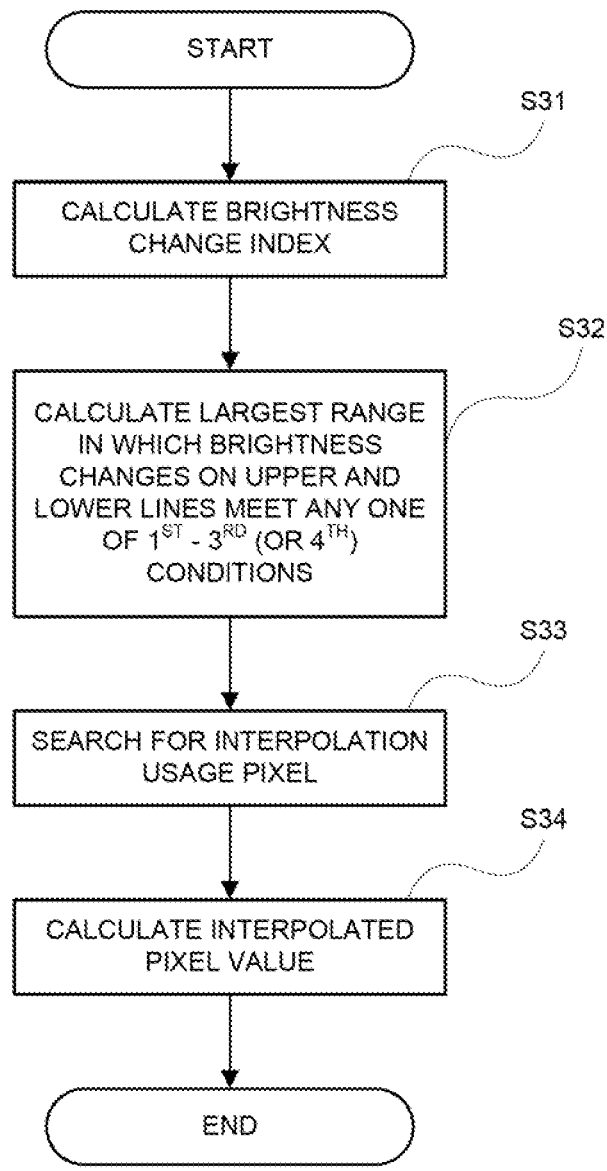
FIG. 10 A flow chart showing an operation of the best mode for carrying out the third aspect of the present invention.

Next, an overall operation of the present embodiment will be described in detail with reference to FIG. 8 and a flow chart in FIG. 10.

The brightness change index calculating means 23 calculates a brightness change index representing a brightness change between adjoining pixels for each line in the image Fin (Step S31).

The searched range calculating means 44 calculates a largest range that meets any one of the first-third or fourth conditions described above as a searched range for each interpolated pixel (Step S32).

The optimally used pixel searching means 11 acquires a pair of pixels having a highest similarity on upper and lower lines point-symmetric with respect to the interpolated pixel within the searched range for each interpolated pixel (Step S33).

The interpolating means 12 uses the optimally used pixels to calculate an interpolated pixel value for each interpolated pixel, and produces an interpolated image (Step S34).

Now a fourth embodiment of the present invention will be described in detail with reference to the accompanying drawings.

Figure 11:
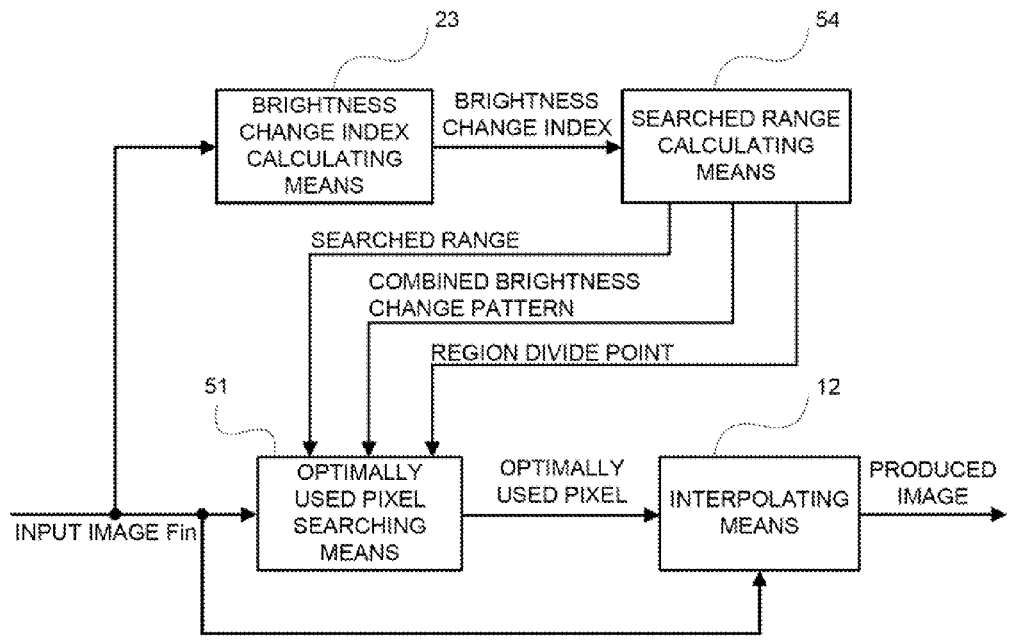
FIG. 11 A block diagram showing a configuration of the best mode for carrying out a fourth aspect of the present invention.

Referring to FIG. 11, the fourth embodiment in accordance with the present invention comprises optimally used pixel searching means 51, interpolating means 12, brightness change index calculating means 23, and searched range calculating means 54.

The fourth embodiment in accordance with the present invention is similar to the third embodiment of the present invention except an operation of the optimally used pixel searching means 51 and searched range calculating means 54; when the brightness change pattern is convex within a searched range, the region is divided into an increasing region and a decreasing region in the searched range calculating means 54, and an optimally used pixel is searched at the optimally used pixel searching means 51 by similarity calculation between only the regions of the same type. The operation of the optimally used pixel searching means 51 and searched range calculating means 54 will be described in detail hereinbelow.

The searched range calculating means 54 is supplied with a brightness change index as input, calculates a largest range in which brightness changes on upper and lower lines meet any one of the first-third conditions or any one of the first-fourth conditions described above for the searched range calculating means 44 in the third embodiment as a searched range for each interpolated pixel, and outputs a searched range, a combined brightness change pattern within the searched range, and a region divide point. The combined brightness change pattern is a value representing a combination of a brightness change pattern on an upper line with that on a lower line within a searched range, and has a value as follows:

(1) Value 0: Increasing or decreasing in the same direction;

(2) Value 1: Convex in the same direction;

(3) Value 2: Monotonically increasing on the upper line and upwardly convex on the lower line, or monotonically decreasing on the upper line and downwardly convex on the lower line;

(4) Value 3: Monotonically decreasing on the upper line and upwardly convex on the lower line, or monotonically increasing on the upper line and downwardly convex on the lower line;

(5) Value 4: Upwardly convex on the upper line and monotonically increasing on the lower line, or downwardly convex on the upper line and monotonically decreasing on the lower line;

(6) Value 5: Upwardly convex on the upper line and monotonically decreasing on the lower line, or downwardly convex on the upper line and monotonically increasing on the lower line; or (7) Value 6: Increasing or decreasing in opposite directions.

These values can be readily determined from values of a brightness change pattern on the upper line and that on the lower line.

Figure 12:
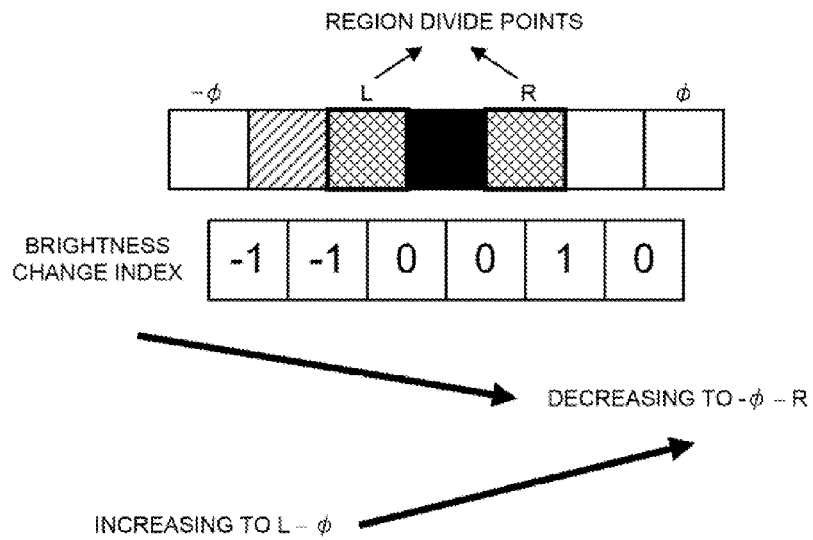
FIG. 12 An explanatory diagram for a region divide point.

The region divide point refers to a point representing a range of an increasing region and that of a decreasing region within a searched range when a brightness change on the upper or lower line is convex. Since a flat region between an increase and a decrease or between a decrease and an increase is taken into account as shown in FIG. 12, the region divide point includes a point R representing a rightmost position in a left region and a point L representing a leftmost position in a right region. The relationship between R and L is represented as R=L+CZ, where the number of continuing zero's for the brightness change index between an increase and a decrease or between a decrease and an increase is designated as CZ.

As in the searched range calculating means 44 in the third embodiment described above, the searched range calculating means 54 calculates a searched range $(-\phi(x, y)-\phi(x, y))$ for an interpolated pixel (x, y) starting from an initial value of $\phi(x, y)=0$ and incrementing $\phi(x, y)$ by one. After calculating the searched range, the searched range calculating means 54 calculates a combined brightness change pattern, and a region divide point. Alternatively, the searched range calculating means 54 may calculate the region divide point simultaneously with calculation of the searched range. The following description will be made on an example of the method of acquiring a region divide point starting from an initial value of $\phi(x, y)=0$ and incrementing $\phi(x, y)$ by one.

<Processing 1>

As an initial value, the values of $\phi(x, y)$, a brightness change pattern LP on a line within a searched range, the number of continuing zero's CZR for the rightmost brightness gradient index in the searched range, and the number of continuing zero's CZL for the leftmost brightness change index in the searched range are set to zero.

<Processing 2>

The searched range is expanded by one pixel each to the right and left, and LP is updated. When the value of LP first reaches three or four, the process goes to Processing 3. Otherwise, $\phi(x, y)$ is incremented by one, the values of CZR and CZL are updated using the brightness change indices for the expanded portion, and Processing 2 is repeated.

<Processing 3>

Region divide points R and L are acquired. The mode of a change of the value of LP when the value of LP reaches three or four may be classified into three cases: a change of the value of LP from zero to three or four (Case 1), a change of the value of LP from one to three or from two to four (Case 2), and a change of the value of LP from one to four or from two to three (Case 3). The region divide points R and L may be acquired for each case as follows:

(1) Case 1: R=$\phi(x, y)$, L=$-\phi(x, y)$
(2) Case 2: R=$\phi(x, y)$, L=R−CZR
(3) Case 3: L=$-\phi(x, y)$, R=L+CZL The optimally used pixel searching means 51 is supplied with an image Fin, a searched range, a combined brightness change pattern, and the region divide points as input, and outputs optimally used pixel information. The optimally used pixel searching means 51 limits a range of 'p' in EQs. (2) and (3) for each interpolated pixel referring to the searched range, combined brightness change pattern and region divide points so that similarity calculation according to EQs. (2) and (3) is applied to matched increasing regions or matched decreasing regions. It should be noted that BR(x, y) designates a position of a brightness divide point R on a lower line for the interpolated pixel (x, y), BL(x, y) designates a position of a brightness divide point L on the lower line for the interpolated pixel (x, y), TR(x, y) designates a position of a brightness divide point R on an upper line for the interpolated pixel (x, y), and TL(x, y) designates a position of a brightness divide point L on the upper line for the interpolated pixel (x, y). L(x, y) and R(x, y) are values calculated according to EQs. (6) and (7), respectively.

(1) When the combined brightness change pattern is 0: $-\phi(x, y) \leq p \leq \phi(x, y)$;

(2) When the combined brightness change pattern is 1: $L(x, y) \leq p \leq R(x, y)$;

(3) When the combined brightness change pattern is 2: $-BR(x, y) \leq p \leq \phi(x, y)$;

(4) When the combined brightness change pattern is 3: $-\phi(x, y) \leq p \leq BL(x, y)$;

(5) When the combined brightness change pattern is 4: $-\phi(x, y) \leq p \leq TR(x, y)$;

(6) When the combined brightness change pattern is 5: $TL(x, y) \leq p \leq \phi(x, y)$; and (7) When the combined brightness change pattern is 6: $-\phi(x, y) \leq p \leq \phi(x, y)$.

[Equation 6]

$$L(x, y, t) = \begin{cases} TL(x, y, t) & \text{if } (TL < -BR(x, y, t)) \\ -BR(x, y, t) & \text{else} \end{cases} \quad \text{EQ. (6)}$$

[Equation 7]

$$R(x, y, t) = \begin{cases} TR(x, y, t) & \text{if } (TR > -BL(x, y, t)) \\ -BL(x, y, t) & \text{else} \end{cases} \quad \text{EQ. (7)}$$

Figure 13:
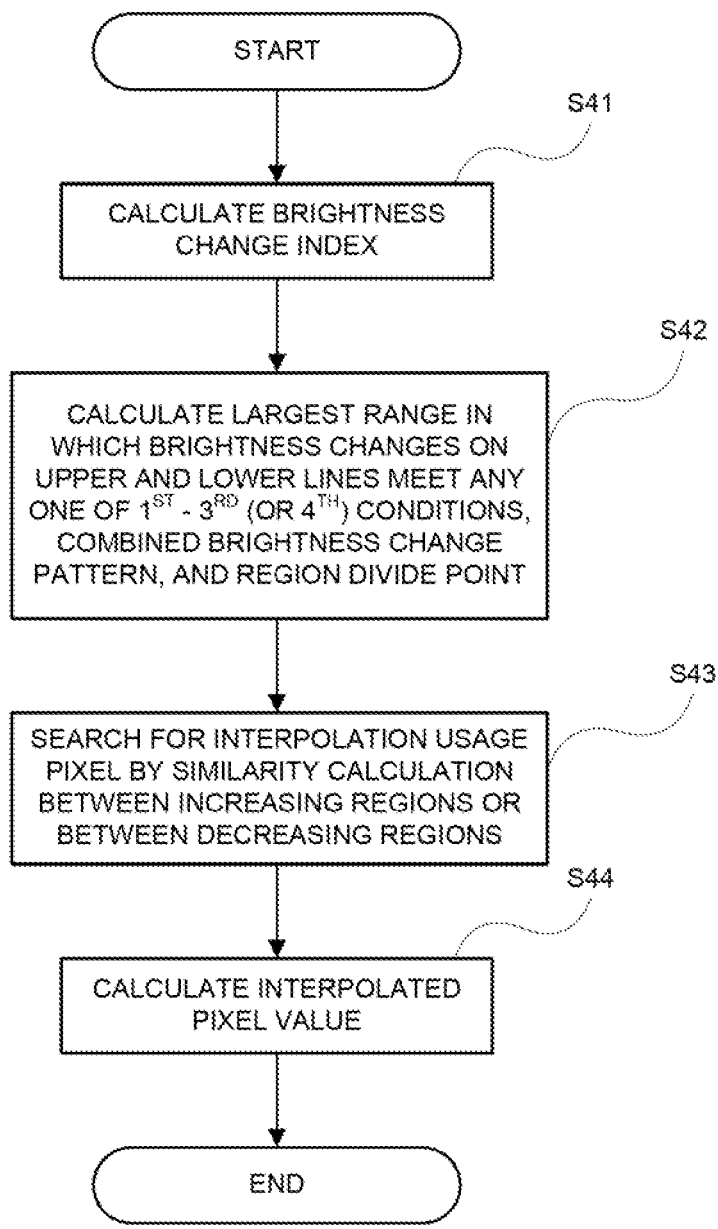
FIG. 13 A flow chart showing an operation of the best mode for carrying out the fourth aspect of the present invention.

Next, an overall operation of the present embodiment will be described in detail with reference to FIG. 11 and a flow chart in FIG. 13.

The brightness change index calculating means 23 calculates a brightness change index representing a brightness change between adjoining pixels for each line in the image Fin (Step S41).

The searched range calculating means 54 performs calculation of a largest range that meets any one of the first-third or fourth conditions described above and calculation of a combined brightness change pattern and a region divide point within that range for each interpolated pixel (Step S42).

The optimally used pixel searching means 51 acquires a pair of pixels having a highest similarity on upper and lower lines point-symmetric with respect to the interpolated pixel within the searched range for each interpolated pixel by similarity calculation between increasing regions or between decreasing regions (Step S43).

The interpolating means 12 uses the optimally used pixels to calculate an interpolated pixel value for each interpolated pixel, and produces a progressive image (Step S44).

Now a fifth embodiment of the present invention will be described in detail with reference to the accompanying drawings.

Figure 14:
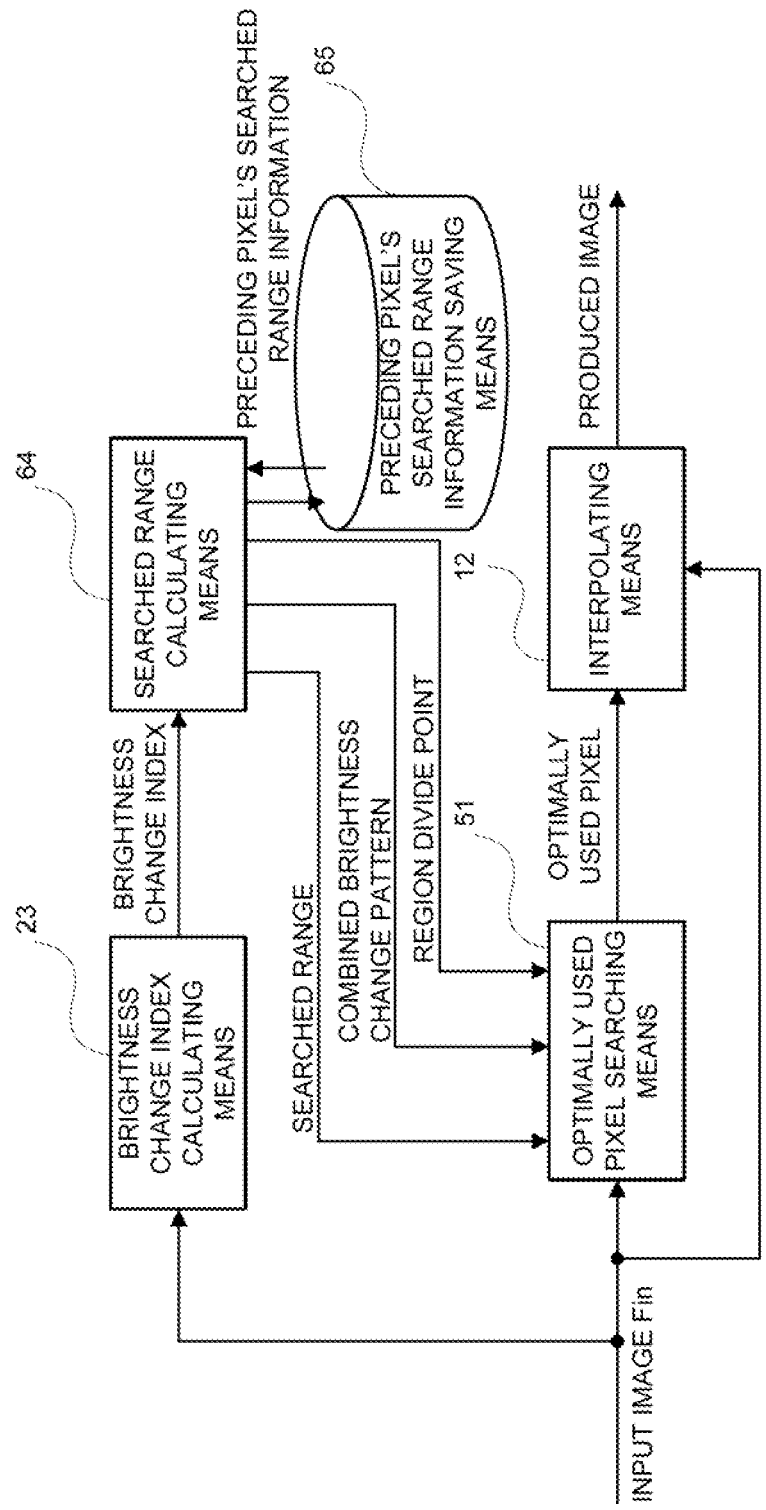
FIG. 14 A block diagram showing a configuration of the best mode for carrying out a fifth aspect of the present invention.

Referring to FIG. 14, the fifth embodiment in accordance with the present invention comprises optimally used pixel searching means 51, interpolating means 12, brightness change index calculating means 23, searched range calculating means 64, and preceding pixel's searched range information saving means 65.

The fifth embodiment in accordance with the present invention is similar to the fourth embodiment of the present invention except that, at the searched range calculating means 64, information on a searched range acquired for a certain interpolated pixel and a brightness change in that searched range is recorded in the preceding pixel's searched range information saving means 65 for use in calculation of a searched range for another interpolated pixel. The operation of the searched range calculating means 64 will be described in detail hereinbelow.

The searched range calculating means 64 is supplied with a brightness change index as input, sequentially calculates a largest area that meets the first-fourth conditions in the fourth embodiment starting from a left edge for each interpolated line, and outputs it as a searched range. As in the second embodiment of the present invention, a searched range for an interpolated pixel (x, y) may be limited to any range from a smallest one coinciding with a right edge of a searched range for a left-adjacent interpolated pixel (x−1, y, t) to a largest one coinciding with a left edge of the searched range for the interpolated pixel (x−1, y, t). These candidate ranges are obtained by adding one or two pixel(s) to the right edge of the searched range for the left-adjacent interpolated pixel (x−1, y, t) or removing one or two pixel(s) from the left edge thereof. For that reason, whether brightness changes on upper and lower lines in each candidate range meet any one of the aforementioned first-fourth conditions may be decided by calculating the brightness change pattern for each line in a range after adding one or two pixel(s) to the right edge of or removing one or two pixel(s) from the left edge of the brightness change pattern on the line in the searched range for the left-adjacent interpolated pixel (x−1, y, t).

The brightness change pattern when the searched range is expanded by adding one pixel to the right edge may be calculated by using the table of FIG. 9 in the third embodiment with a brightness change index to be added to the left set to zero.

Figure 15:
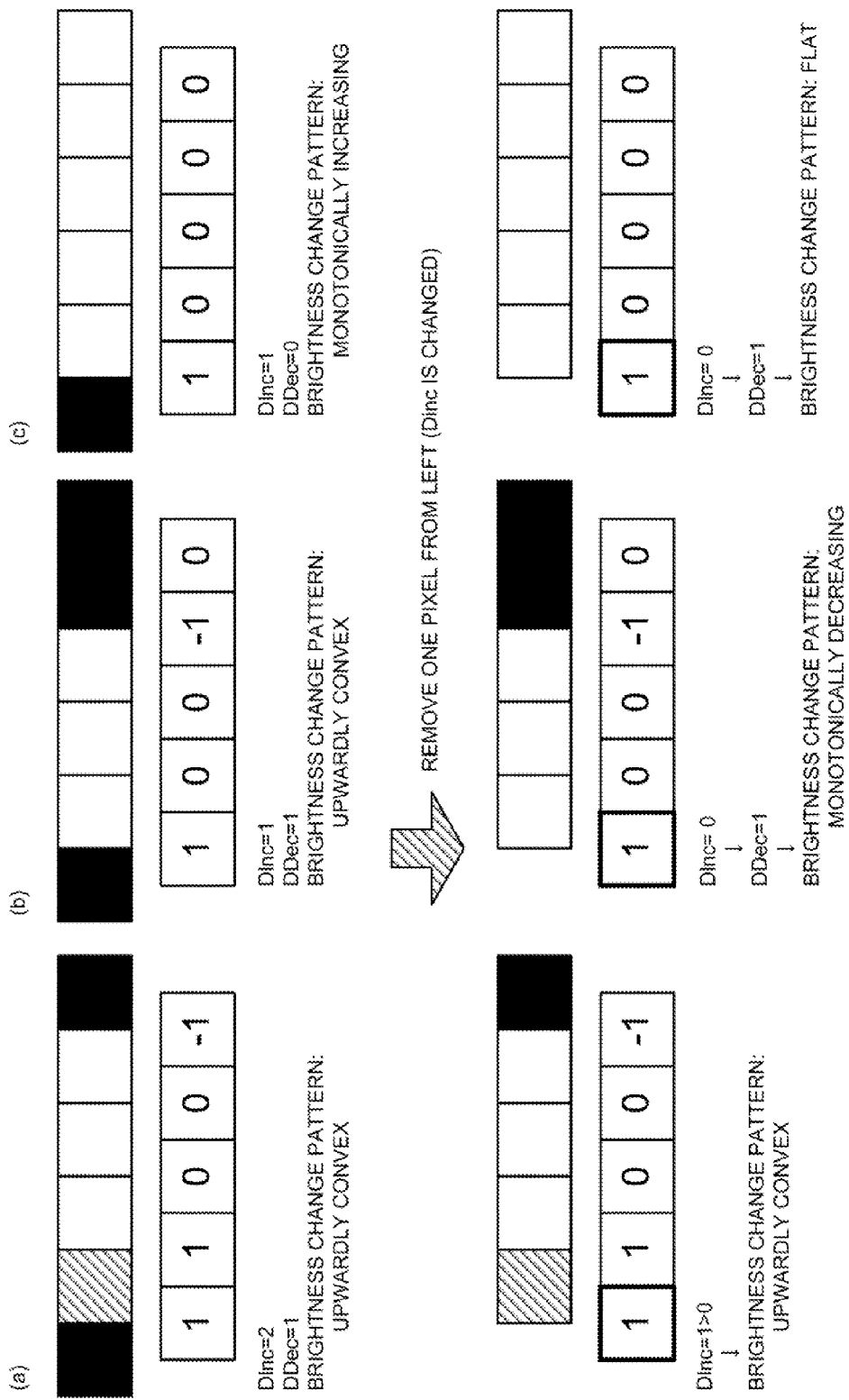
FIG. 15 An explanatory diagram for a method of acquiring a brightness change pattern.

Moreover, the brightness change pattern when the searched range is reduced by removing one pixel from the left edge may be acquired, as shown in FIG. 15, by using the number DInc of the brightness change index having a value of one and the number DDec of the brightness change index having a value of minus one within a searched range, and when the value of DInc or DDec is unchanged by reduction of the searched range, or when the value of DInc or DDec that is changed is positive, outputting the brightness change pattern without any modification, or when DInc or DDec that is changed by reduction of the searched range is zero, setting any one of values representing flat, increasing and decreasing according to the value of the other of DInc or DDec.

Then, the searched range calculating means 64 records the acquired searched range, the brightness change patterns on upper and lower lines within that searched range, and the number of one's (increasing) and the number of minus one's (decreasing) for the brightness change index within that searched range into the preceding pixel's searched range information saving means 65 as preceding pixel's searched range information, and when acquiring a searched range for a right-adjacent interpolated pixel, it acquires a largest range by reading the recorded information and using the read information to decide settings of the candidate searched ranges and decide whether each candidate range meets any one of the four conditions, and outputs the result as a searched range.

Moreover, the searched range calculating means 64 calculates a combined brightness change pattern and a region divide point. The searched range calculating means 54 may calculate the region divide point simultaneously with calculation of the searched range. In this case, the region divide point may be calculated by using a region divide point within a searched range for a left-adjacent interpolated pixel as preceding pixel's searched range information, and the number of continuing zero's CZR for the rightmost brightness change index in the searched range. An example will be provided below. When the brightness change pattern for an interpolated pixel is changed to an upwardly or downwardly convex pattern after the searched range is expanded to the right by one pixel, a region divide point is calculated using the position of the right edge and the value of CZR. Otherwise, the stored positional information on the region divide point is used and set because the region divide point lies at the same position as that before expansion.

Figure 16:
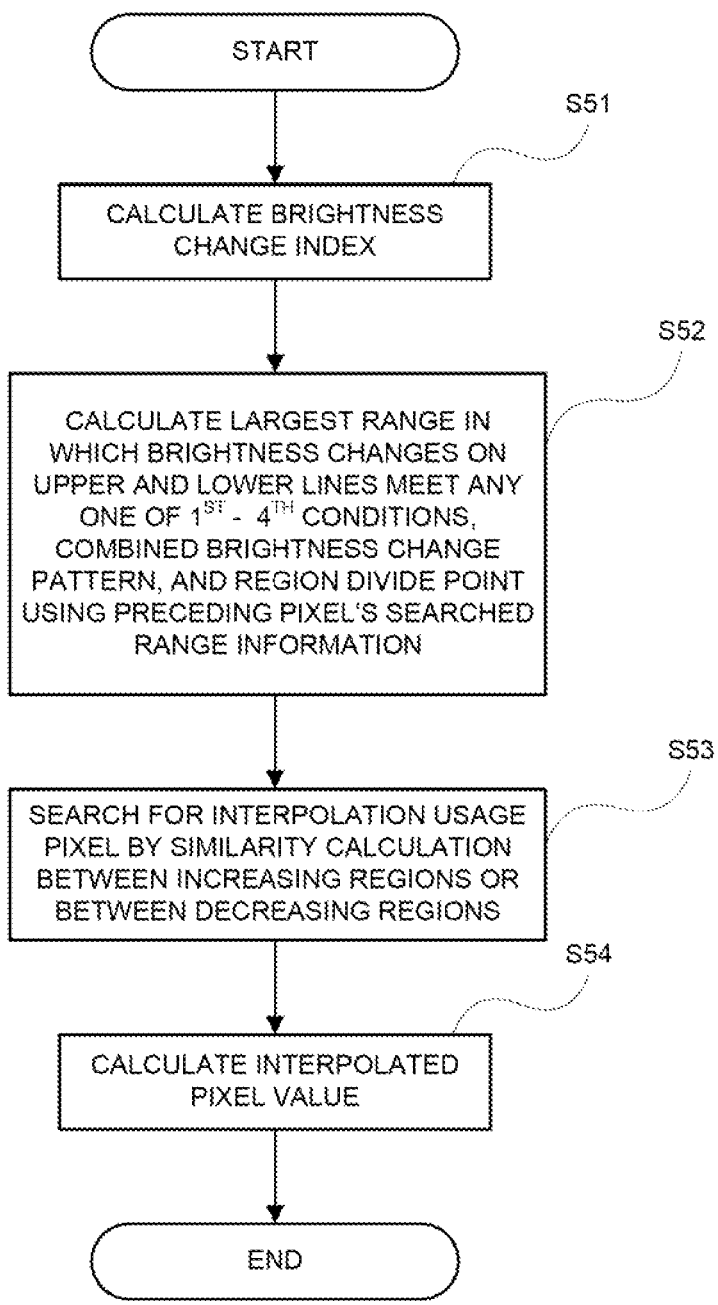
FIG. 16 A flow chart showing an operation of the best mode for carrying out the fifth aspect of the present invention.
Figure 17:
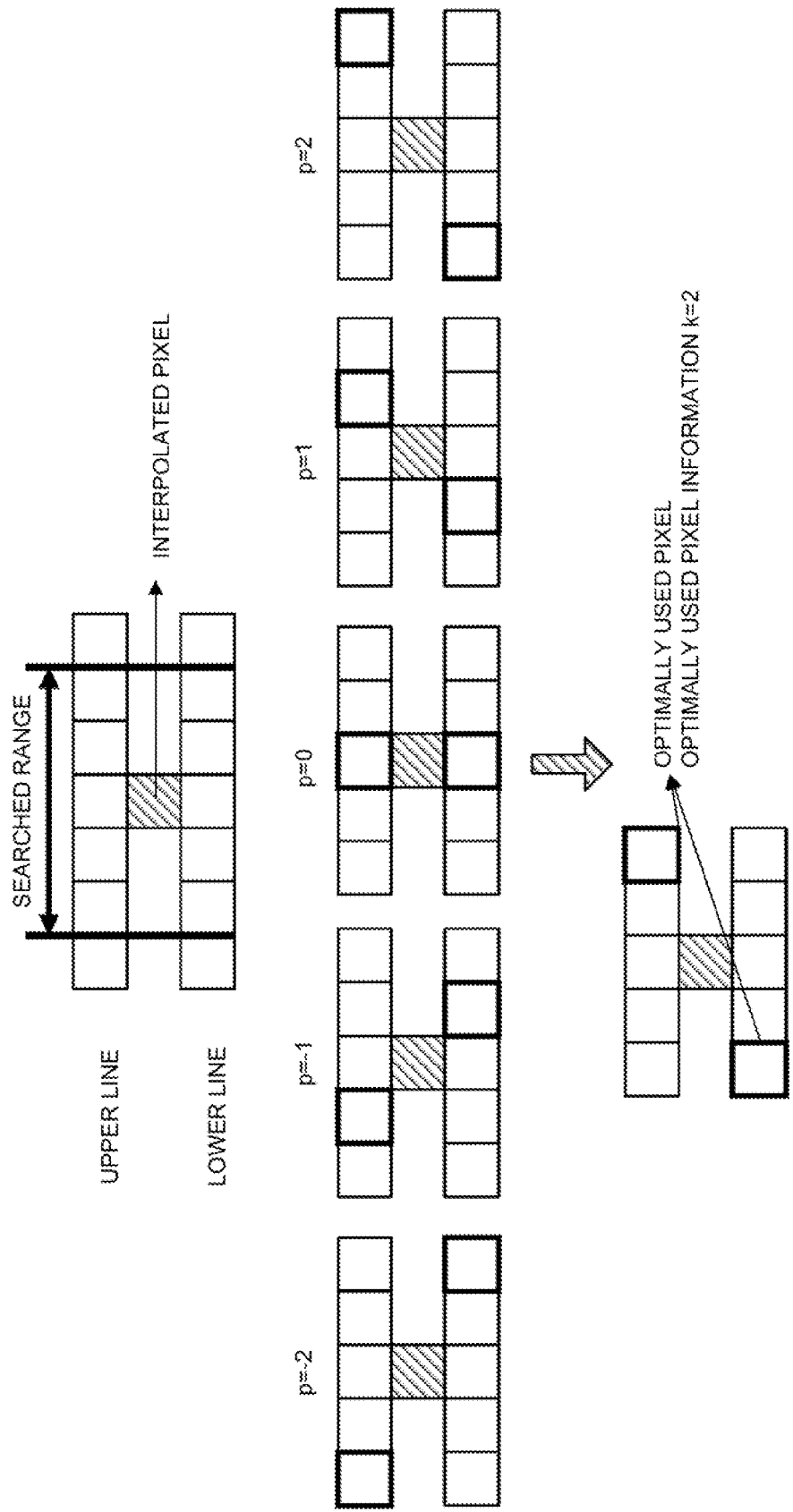
FIG. 17 An explanatory diagram representing the summary of processing in a conventional technique.
Figure 18:
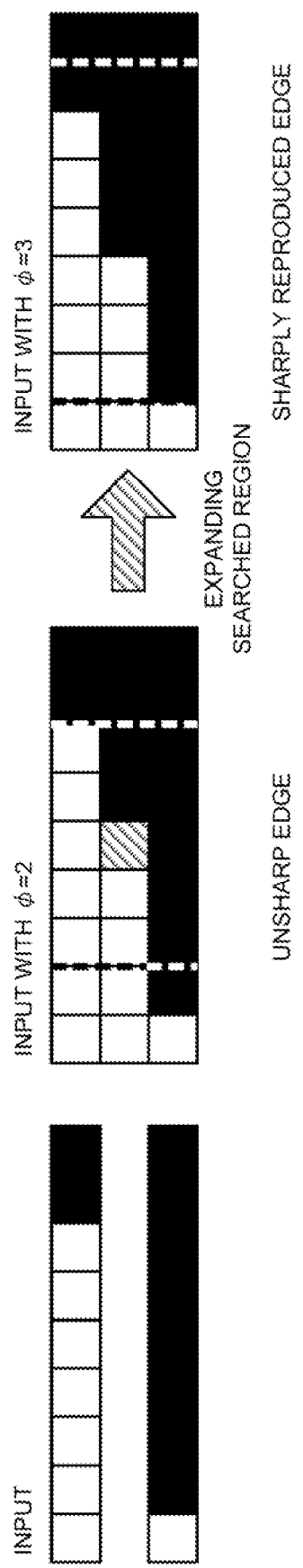
FIG. 18 An explanatory diagram of a problem in the conventional technique.
Figure 19:
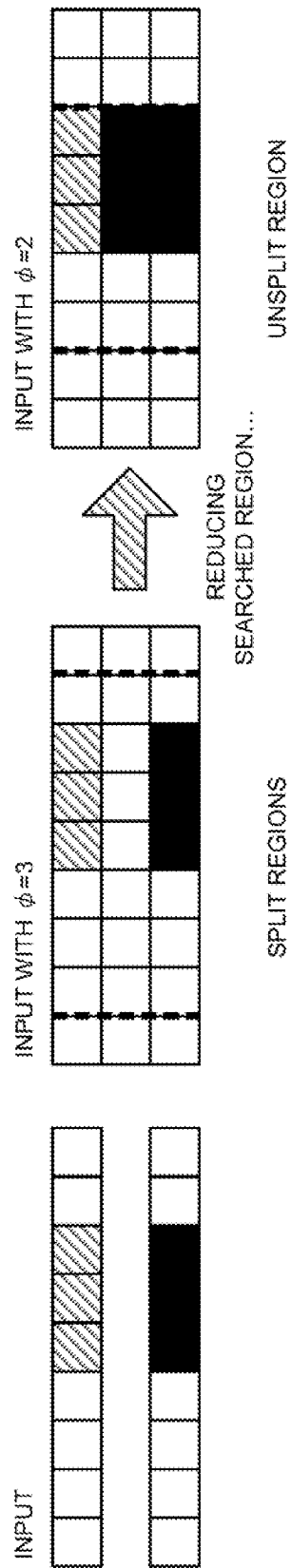
FIG. 19 An explanatory diagram of the problem in the conventional technique.

Next, an overall operation of the present embodiment will be described in detail with reference to FIG. 14 and a flow chart in FIG. 16.

The brightness change index calculating means 23 calculates a brightness change index representing a brightness change between adjoining pixels for each line in the image Fin (Step S51).

The searched range calculating means 64 uses the preceding pixel's searched range information 65 to perform calculation of a largest range that meets any one of the aforementioned first-third or fourth conditions and calculation of a combined brightness change pattern and a region divide point within that range for each interpolated pixel (Step S52).

The optimally used pixel searching means 51 acquires a pair of pixels having a highest similarity on upper and lower lines point-symmetric with respect to the interpolated pixel within the searched range for each interpolated pixel by similarity calculation between increasing regions or between decreasing regions (Step S53).

The interpolating means 12 uses the optimally used pixels to calculate an interpolated pixel value for each interpolated pixel, and produces a progressive image (Step S54).

While several embodiments have been described, the embodiments of the present invention are listed as follows:

The 1st example of the present invention is characterized in that an image interpolation method for determining, from two adjacent image lines, pixel values on an image line therebetween, comprising: acquiring brightness changes of pixels on said two image lines; determining a region of said two image lines in which only one portion similar to a portion of the brightness change on one image line is present in the brightness change on the other image line in proximity of said interpolated image; selecting a group of pixels within said region having a highest similarity from groups of pixels positioned symmetrically with respect to said interpolated pixel; and determining a pixel value of said interpolated pixel using pixel values of the selected group.

The 2nd example of the present invention in the abovementioned 1st example is characterized in that a largest region in which less than two portions similar to a portion of the brightness change on one image line are present in the brightness change on the other image line at different positions is calculated.

The 3rd example of the present invention in the abovementioned 1st or 2nd examples is characterized in that three indices including flat, increasing and decreasing are used as the brightness change between adjoining pixels.

The 4th example of the present invention in the abovementioned any one of 1st to 3rd examples is characterized in that six patterns including flat, monotonically increasing, monotonically decreasing, upwardly convex, downwardly convex, and others are used as the brightness change on each image line within the region.

The 5th example of the present invention in the above-mentioned any one of 1st to 4th examples is characterized in that a region in which brightness changes on two image lines increase or decrease in the same direction is calculated.

The 6th example of the present invention in the above-mentioned any one of 1st to 4th examples is characterized in that a region in which brightness changes on two image lines meet any one of the followings is calculated: increasing or decreasing in the same direction, convex in the same direction, and one increasing or decreasing and the other convex.

The 7th example of the present invention in the above-mentioned any one of 1st to 4th examples is characterized in that a region in which brightness changes on two image lines meet any one of the followings is calculated: increasing or decreasing in the same direction, convex in the same direction, one increasing or decreasing and the other convex, and increasing or decreasing in opposite directions.

The 8th example of the present invention in the above-mentioned 6th or 7th examples is characterized in that, when a brightness change on an image line is upwardly or downwardly convex, a region divide point representing a position between an increasing region and a decreasing region within the region is calculated.

The 9th example of the present invention in the above-mentioned 8th example is characterized in that similarity calculation between increasing regions and between decreasing regions is performed.

The 10th example of the present invention in the above-mentioned any one of 1st to 9th examples is characterized in that, in calculation of the region, information on a region calculated for an adjacent pixel on an interpolated line is used.

The 11th example of the present invention in the above-mentioned 10th example is characterized in that, as the information on a region calculated for an adjacent pixel on the interpolated line, an extent of the region and the number of a count of each index for a brightness change between adjoining pixels within the region are used.

The 12th example of the present invention in the above-mentioned 10th example is characterized in that, as the information on a region calculated for an adjacent pixel on the interpolated line, an extent of the region, the number of a count of each index for a brightness change between adjoining pixels within the region, and a brightness change pattern on each line within the region are used.

The 13th example of the present invention in the above-mentioned 10th example is characterized in that, as the information on a region calculated for an adjacent pixel on the interpolated line, an extent of the region, the number of a count of each index for a brightness change between adjoining pixels within the region, a brightness change pattern on each line within the region, and a region divide point are used.

The 14th example of the present invention is characterized in that an image interpolation method comprising: a brightness change index calculating step of calculating which one of indices a brightness change between adjoining pixels is ascribed to, said indices including flat, increasing and decreasing; a searched range calculating step of calculating a region in which brightness changes on two image lines increase or decrease in the same direction; an optimally used pixel searching step of selecting a group of pixels having a highest similarity from groups of pixels on image lines point-symmetric with respect to an interpolated pixel within the region; and an interpolating step of determining an interpolated value using the selected group having a highest similarity.

The 15th example of the present invention is characterized in that an image interpolation method comprising: a brightness change index calculating step of calculating which one of indices a brightness change between adjoining pixels is ascribed to, said indices including flat, increasing and decreasing; a searched range calculating step of calculating a region in which brightness changes on two image lines increase or decrease in the same direction using information on a region calculated for an adjacent pixel on an interpolated line; an optimally used pixel searching step of selecting a group of pixels having a highest similarity from groups of pixels on image lines point-symmetric with respect to an interpolated pixel within the region; and an interpolating step of determining an interpolated value using the selected group having a highest similarity.

The 16th example of the present invention is characterized in that an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, and one increasing or decreasing and the other convex; an optimally used pixel searching step of selecting a group of pixels having a highest similarity from groups of pixels on image lines point-symmetric with respect to an interpolated pixel within the region; and an interpolating step of determining an interpolated value using the selected group having a highest similarity.

The 17th example of the present invention is characterized in that an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, one increasing or decreasing and the other convex, and increasing or decreasing in opposite directions; an optimally used pixel searching step of selecting a group of pixels having a highest similarity from groups of pixels on image lines point-symmetric with respect to an interpolated pixel within the region; and an interpolating step of determining an interpolated value using the selected group having a highest similarity.

The 18th example of the present invention is characterized in that an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, and one increasing or decreasing and the other convex; an optimally used pixel searching step of selecting a group of pixels having a highest similarity from groups of pixels on image lines point-symmetric with respect to an interpolated pixel within the region by similarity calculation between increasing regions and between decreasing regions; and an interpolating step of determining an interpolated value using the selected group having a highest similarity.

The 14th example of the present invention is characterized in that an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, one increasing or decreasing and the other convex, and increasing or decreasing in opposite directions; an optimally used pixel searching step of selecting a group of pixels having a highest similarity from groups of pixels on image lines point-symmetric with respect to an interpolated pixel within the region by similarity calculation between increasing regions and between decreasing regions; and an interpolating step of determining an interpolated value using the selected group having a highest similarity.

The 20th example of the present invention is characterized in that an image interpolation method comprising: a brightness change index calculating step of calculating which one of indices a brightness change between adjoining pixels is ascribed to, said indices including flat, increasing and decreasing; a searched range calculating step of calculating a largest region in which brightness changes on two image lines meet any one of the followings: increasing or decreasing in the same direction, convex in the same direction, one increasing or decreasing and the other convex, and increasing or decreasing in opposite directions, using information on a region selected for an adjacent pixel on an interpolated line; an optimally used pixel searching step of selecting a group of pixels having a highest similarity from groups of pixels on image lines point-symmetric with respect to an interpolated pixel within the region by similarity calculation between increasing regions and between decreasing regions; an interpolating step of determining an interpolated value using the selected group having a highest similarity.

The 21st example of the present invention is characterized in that an image interpolation apparatus for determining, from two adjacent image lines, pixel values on an image line therebetween, wherein: brightness changes of pixels on said two image lines is acquired; a region of said two image lines in which only one portion similar to a portion of the brightness change on one image line is present in the brightness change on the other image line in proximity of said interpolated image is determined; a group of pixels within said region having a highest similarity from groups of pixels positioned symmetrically with respect to said interpolated pixel are selected; and a pixel value of said interpolated pixel is determined using pixel values of the selected group.

The 22nd example of the present invention in the abovementioned 21st example is characterized in that a largest region in which less than two portions similar to a portion of the brightness change on one image line are present in the brightness change on the other image line at different positions is calculated.

The 23rd example of the present invention in the abovementioned 21st or 22nd examples is characterized in that three indices including flat, increasing and decreasing are used as the brightness change between adjoining pixels.

The 24th example of the present invention in the abovementioned any one of 21st to 23rd examples is characterized in that six patterns including flat, monotonically increasing, monotonically decreasing, upwardly convex, downwardly convex, and others are used as the brightness change on each image line within the region.

The 25th example of the present invention in the abovementioned any one of 21st to 24th examples is characterized in that a region in which brightness changes on two image lines increase or decrease in the same direction is calculated.

The 26th example of the present invention in the abovementioned any one of 21st to 24th examples is characterized in that a region in which brightness changes on two image lines meet any one of the followings is calculated: increasing or decreasing in the same direction, convex in the same direction, and one increasing or decreasing and the other convex.

The 27th example of the present invention in the abovementioned any one of 21st to 24th examples is characterized in that a region in which brightness changes on two image lines meet any one of the followings is calculated: increasing or decreasing in the same direction, convex in the same direction, one increasing or decreasing and the other convex, and increasing or decreasing in opposite directions.

The 28th example of the present invention in the abovementioned 26th or 27th examples is characterized in that, when a brightness change on an image line is upwardly or downwardly convex, a region divide point representing a position between an increasing region and a decreasing region within the region is calculated.

The 29th example of the present invention in the abovementioned 28th example is characterized in that similarity calculation between increasing regions and between decreasing regions is performed.

The 30th example of the present invention in the abovementioned 21st or 28th examples is characterized in that, in calculation of the region, information on a region calculated for an adjacent pixel on an interpolated line is used.

The 31st example of the present invention in the abovementioned 30th example is characterized in that, as the information on a region calculated for an adjacent pixel on the interpolated line, an extent of the region and the number of a count of each index for a brightness change between adjoining pixels within the region are used.

The 32nd example of the present invention in the abovementioned 30th example is characterized in that, as the information on a region calculated for an adjacent pixel on the interpolated line, an extent of the region, the number of a count of each index for a brightness change between adjoining pixels within the region, and a brightness change pattern on each line within the region are used.

The 33rd example of the present invention in the abovementioned 30th example is characterized in that, as the information on a region calculated for an adjacent pixel on the interpolated line, an extent of the region, the number of a count of each index for a brightness change between adjoining pixels within the region, a brightness change pattern on each line within the region, and a region divide point are used.

The 34th example of the present invention characterized in that an image interpolation apparatus comprising: brightness change index calculating means for calculating which one of indices a brightness change between adjoining pixels is ascribed to, said indices including flat, increasing and decreasing; searched range calculating means for calculating a region in which brightness changes on two image lines increase or decrease in the same direction; optimally used pixel searching means for selecting a group of pixels having a highest similarity from groups of pixels on image lines point-symmetric with respect to an interpolated pixel within the region; and interpolating means for determining an interpolated value using the selected group having a highest similarity.

The 35th example of the present invention characterized in that an image interpolation apparatus comprising: brightness change index calculating means for calculating which one of indices a brightness change between adjoining pixels is ascribed to, said indices including flat, increasing and decreasing; searched range calculating means for calculating a region in which brightness changes on two image lines increase or decrease in the same direction using information on a region calculated for an adjacent pixel on an interpolated line; optimally used pixel searching means for selecting a group of pixels having a highest similarity from groups of pixels on image lines point-symmetric with respect to an interpolated pixel within the region; and interpolating means for determining an interpolated value using the selected group having a highest similarity.

The 36th example of the present invention characterized in that an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, and one increasing or decreasing and the other convex; optimally used pixel searching means for selecting a group of pixels having a highest similarity from groups of pixels on image lines point-symmetric with respect to an interpolated pixel within the region; and interpolating means for determining an interpolated value using the selected group having a highest similarity.

The 37th example of the present invention characterized in that an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, one increasing or decreasing and the other convex, and increasing or decreasing in opposite directions; optimally used pixel searching means for selecting a group of pixels having a highest similarity from groups of pixels on image lines point-symmetric with respect to an interpolated pixel within the region; and interpolating means for determining an interpolated value using the selected group having a highest similarity.

The 38th example of the present invention characterized in that an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, and one increasing or decreasing and the other convex; optimally used pixel searching means for selecting a group of pixels having a highest similarity from groups of pixels on image lines point-symmetric with respect to an interpolated pixel within the region by similarity calculation between increasing regions and between decreasing regions; and interpolating means for determining an interpolated value using the selected group having a highest similarity.

The 39th example of the present invention characterized in that an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, one increasing or decreasing and the other convex, and increasing or decreasing in opposite directions; optimally used pixel searching means for selecting a group of pixels having a highest similarity from groups of pixels on image lines point-symmetric with respect to an interpolated pixel within the region by similarity calculation between increasing regions and between decreasing regions; and interpolating means for determining an interpolated value using the selected group having a highest similarity.

The 40th example of the present invention characterized in that an image interpolation apparatus comprising: brightness change index calculating means for calculating which one of indices a brightness change between adjoining pixels is ascribed to, said indices including flat, increasing and decreasing; searched range calculating means for calculating a largest region in which brightness changes on two image lines meet any one of the followings: increasing or decreasing in the same direction, convex in the same direction, one increasing or decreasing and the other convex, and increasing or decreasing in opposite directions, using information on a region selected for an adjacent pixel on an interpolated line; optimally used pixel searching means for selecting a group of pixels having a highest similarity from groups of pixels on image lines point-symmetric with respect to an interpolated pixel within the region by similarity calculation between increasing regions and between decreasing regions; interpolating means for determining an interpolated value using the selected group having a highest similarity.

The 41st example of the present invention characterized in that a program for image interpolation for determining, from two adjacent image lines, pixel values on an image line therebetween, wherein the program causes an information processing apparatus to execute the processing of: acquiring brightness changes of pixels on said two image lines; determining a region of said two image lines in which only one portion similar to a portion of the brightness change on one image line is present in the brightness change on the other image line in proximity of said interpolated image; selecting a group of pixels within said region having a highest similarity from groups of pixels positioned symmetrically with respect to said interpolated pixel; and determining a pixel value of said interpolated pixel using pixel values of the selected group.

While the invention has been particularly shown and described with reference to exemplary embodiments and examples thereof, the invention is not limited to these exemplary embodiments and examples. It will be understood by those of ordinary skill in the art that various changes in form and details may be made therein without departing from the spirit and scope of the present invention as defined by the claims.

This application is the National Phase of PCT/JP2008/062061, filed Jul. 3, 2008 which is based upon and claims the benefit of priority from Japanese patent application No. 2007-174823, filed on Jul. 3, 2007, the disclosure of which is incorporated herein in its entirety by reference.

APPLICABILITY IN INDUSTRY

The present invention may be applied to an interlaced-to-progressive format conversion apparatus that produces a progressive image from an interlaced image. The present invention may also be applied to an image interpolation apparatus that performs image scaling-up in a longitudinal direction.

The invention claimed is:

1. An image interpolation method for determining, from two adjacent image lines, pixel values on an image line therebetween, comprising:
    acquiring brightness changes of pixels between said two image lines;
    determining a region of said two image lines in which only one portion similar to a portion of the brightness change on one image line is present in the brightness change on the other image line in proximity of said interpolated image, by:
        for each of a plurality of adjacent pixel pairs between said two image lines, each adjacent pixel pair including a first pixel and a second pixel,
            classifying an index as a first value where a brightness change from the first pixel to the second pixel is greater than a positive threshold of N;
            classifying the index as a second value where the brightness change is less than a negative threshold of −N;
            classifying the index as the third value where the brightness change is not greater than the positive threshold of N and is not less than the negative threshold of −N;
    selecting a group of pixels within said region having a highest similarity from groups of pixels positioned symmetrically with respect to said interpolated pixel, based on the index of each adjacent pixel pair; and
    determining a pixel value of said interpolated pixel using pixel values of the selected group.

2. An image interpolation method according to claim 1, wherein a largest region in which less than two portions similar to a portion of the brightness change on one image line are present in the brightness change on the other image line at different positions is calculated.

3. An image interpolation method according to claim 1, wherein six patterns including flat, monotonically increasing, monotonically decreasing, upwardly convex, downwardly convex, and others are used as the brightness change on each image line within the region.

4. An image interpolation method according to claim 1, wherein a region in which brightness changes on two image lines meet any one of the followings is calculated: increasing or decreasing in the same direction, convex in the same direction, and one increasing or decreasing and the other convex.

5. An image interpolation method according to claim 4, wherein, when a brightness change on an image line is upwardly or downwardly convex, a region divide point representing a position between an increasing region and a decreasing region within the region is calculated.

6. An image interpolation method according to claim 5, wherein similarity calculation between increasing regions and between decreasing regions is performed.

7. An image interpolation method according to claim 1, wherein, in calculation of the region, information on a region calculated for an adjacent pixel on an interpolated line is used.

8. An image interpolation apparatus for determining, from two adjacent image lines, pixel values on an image line therebetween, wherein:
    brightness changes of pixels between said two image lines is acquired;
    a region of said two image lines in which only one portion similar to a portion of the brightness change on one image line is present in the brightness change on the other image line in proximity of said interpolated image is determined, by:
        for each of a plurality of adjacent pixel pairs between said two image lines, each adjacent pixel pair including a first pixel and a second pixel,
            classifying an index as a first value where a brightness change from the first pixel to the second pixel is greater than a positive threshold of N;
            classifying the index as a second value where the brightness change is less than a negative threshold of −N;
            classifying the index as the third value where the brightness change is not greater than the positive threshold of N and is not less than the negative threshold of −N;
    a group of pixels within said region having a highest similarity from groups of pixels positioned symmetrically with respect to said interpolated pixel are selected, based on the index of each adjacent pixel pair; and
    a pixel value of said interpolated pixel is determined using pixel values of the selected group.

9. An image interpolation apparatus according to claim 8, wherein a largest region in which less than two portions similar to a portion of the brightness change on one image line are present in the brightness change on the other image line at different positions is calculated.

10. An image interpolation apparatus according to claim 8, wherein six patterns including flat, monotonically increasing, monotonically decreasing, upwardly convex, downwardly convex, and others are used as the brightness change on each image line within the region.

11. An image interpolation apparatus according to claim 8, wherein a region in which brightness changes on two image lines meet any one of the followings is calculated: increasing or decreasing in the same direction, convex in the same direction, and one increasing or decreasing and the other convex.

12. An image interpolation apparatus according to claim 11, wherein, when a brightness change on an image line is upwardly or downwardly convex, a region divide point representing a position between an increasing region and a decreasing region within the region is calculated.

13. An image interpolation apparatus according to claim 12, wherein similarity calculation between increasing regions and between decreasing regions is performed.

14. An image interpolation apparatus according to claim 8, wherein, in calculation of the region, information on a region calculated for an adjacent pixel on an interpolated line is used.

15. An image interpolation apparatus comprising:
    brightness change index calculator that calculates which one of indices a brightness change between adjoining pixels is ascribed to, said indices including flat, increasing and decreasing;
    searched range calculator that calculates a region in which brightness changes between two image lines increase or decrease in the same direction, by:
        for each of a plurality of adjacent pixel pairs between said two image lines, each adjacent pixel pair including a first pixel and a second pixel,
            classifying an index as a first value where a brightness change from the first pixel to the second pixel is greater than a positive threshold of N;
            classifying the index as a second value where the brightness change is less than a negative threshold of −N;

classifying the index as the third value where the brightness change is not greater than the positive threshold of N and is not less than the negative threshold of –N;

optimally used pixel searching unit that selects a group of pixels having a highest similarity from groups of pixels on image lines point-symmetric with respect to an interpolated pixel within the region, based on the index of each adjacent pixel pair; and interpolator that determines an interpolated value using the selected group having a highest similarity.

16. An image interpolation apparatus comprising:

brightness change index calculator that calculates which one of indices a brightness change between adjoining pixels is ascribed to, said indices including flat, increasing and decreasing;

searched range calculator that calculates a region in which brightness changes between two image lines increase or decrease in the same direction using information on a region calculated for an adjacent pixel on an interpolated line, by:
- for each of a plurality of adjacent pixel pairs between said two image lines, each adjacent pixel pair including a first pixel and a second pixel,
  - classifying an index as a first value where a brightness change from the first pixel to the second pixel is greater than a positive threshold of N;
  - classifying the index as a second value where the brightness change is less than a negative threshold of –N;
  - classifying the index as the third value where the brightness change is not greater than the positive threshold of N and is not less than the negative threshold of –N;

optimally used pixel searching unit that selects a group of pixels having a highest similarity from groups of pixels on image lines point-symmetric with respect to an interpolated pixel within the region, based on the index of each adjacent pixel pair; and interpolator that determines an interpolated value using the selected group having a highest similarity.

17. An image interpolation apparatus comprising:

brightness change index calculator that calculates which one of indices a brightness change between adjoining pixels is ascribed to, said indices including flat, increasing and decreasing;

searched range calculator that calculates a largest region in which brightness changes between two image lines meet any one of the followings: increasing or decreasing in the same direction, convex in the same direction, and one increasing or decreasing and the other convex, by:
- for each of a plurality of adjacent pixel pairs between said two image lines, each adjacent pixel pair including a first pixel and a second pixel,
  - classifying an index as a first value where a brightness change from the first pixel to the second pixel is greater than a positive threshold of N;
  - classifying the index as a second value where the brightness change is less than a negative threshold of –N;
  - classifying the index as the third value where the brightness change is not greater than the positive threshold of N and is not less than the negative threshold of –N, optimally used pixel searching unit that selects a group of pixels having a highest similarity from groups of pixels on image lines point-symmetric with respect to an interpolated pixel within the region, based on the index of each adjacent pixel pair; and interpolator that determines an interpolated value using the selected group having a highest similarity.

18. An image interpolation apparatus comprising:

brightness change index calculator that calculates which one of indices a brightness change between adjoining pixels is ascribed to, said indices including flat, increasing and decreasing;

searched range calculator that calculates a largest region in which brightness changes between two image lines meet any one of the followings: increasing or decreasing in the same direction, convex in the same direction, one increasing or decreasing and the other convex, and increasing or decreasing in opposite directions, by:
- for each of a plurality of adjacent pixel pairs between said two image lines, each adjacent pixel pair including a first pixel and a second pixel,
  - classifying an index as a first value where a brightness change from the first pixel to the second pixel is greater than a positive threshold of N;
  - classifying the index as a second value where the brightness change is less than a negative threshold of –N;
  - classifying the index as the third value where the brightness change is not greater than the positive threshold of N and is not less than the negative threshold of –N;

optimally used pixel searching unit that selects a group of pixels having a highest similarity from groups of pixels on image lines point-symmetric with respect to an interpolated pixel within the region, based on the index of each adjacent pixel pair; and interpolator that determines an interpolated value using the selected group having a highest similarity.

19. An image interpolation apparatus comprising:

brightness change index calculator that calculates which one of indices a brightness change between adjoining pixels is ascribed to, said indices including flat, increasing and decreasing;

searched range calculator that calculates a largest region in which brightness changes between two image lines meet any one of the followings: increasing or decreasing in the same direction, convex in the same direction, and one increasing or decreasing and the other convex, by:
- for each of a plurality of adjacent pixel pairs between said two image lines, each adjacent pixel pair including a first pixel and a second pixel,
  - classifying an index as a first value where a brightness change from the first pixel to the second pixel is greater than a positive threshold of N;
  - classifying the index as a second value where the brightness change is less than a negative threshold of –N;
  - classifying the index as the third value where the brightness change is not greater than the positive threshold of N and is not less than the negative threshold of –N;

optimally used pixel searching unit that selects a group of pixels having a highest similarity from groups of pixels on image lines point-symmetric with respect to an interpolated pixel within the region by similarity calculation between increasing regions and between decreasing regions, based on the index of each adjacent pixel pair; and interpolator that determines an interpolated value using the selected group having a highest similarity.

20. An image interpolation apparatus comprising:
brightness change index calculator that calculates which one of indices a brightness change between adjoining pixels is ascribed to, said indices including flat, increasing and decreasing;
searched range calculator that calculates a largest region in which brightness changes between two image lines meet any one of the followings: increasing or decreasing in the same direction, convex in the same direction, one increasing or decreasing and the other convex, and increasing or decreasing in opposite directions, by:
  for each of a plurality of adjacent pixel pairs between said two image lines, each adjacent pixel pair including a first pixel and a second pixel,
    classifying an index as a first value where a brightness change from the first pixel to the second pixel is greater than a positive threshold of N;
    classifying the index as a second value where the brightness change is less than a negative threshold of −N;
    classifying the index as the third value where the brightness change is not greater than the positive threshold of N and is not less than the negative threshold of −N;
optimally used pixel searching unit that selects a group of pixels having a highest similarity from groups of pixels on image lines point-symmetric with respect to an interpolated pixel within the region by similarity calculation between increasing regions and between decreasing regions, based on the index of each adjacent pixel pair; and
interpolator that determines an interpolated value using the selected group having a highest similarity.

21. An image interpolation apparatus comprising:
brightness change index calculator that calculates which one of indices a brightness change between adjoining pixels is ascribed to, said indices including flat, increasing and decreasing;
searched range calculator that calculates a largest region in which brightness changes between two image lines meet any one of the followings: increasing or decreasing in the same direction, convex in the same direction, one increasing or decreasing and the other convex, and increasing or decreasing in opposite directions, using information on a region selected for an adjacent pixel on an interpolated line, by:
  for each of a plurality of adjacent pixel pairs between said two image lines, each adjacent pixel pair including a first pixel and a second pixel,
    classifying an index as a first value where a brightness change from the first pixel to the second pixel is greater than a positive threshold of N;
    classifying the index as a second value where the brightness change is less than a negative threshold of −N;
    classifying the index as the third value where the brightness change is not greater than the positive threshold of N and is not less than the negative threshold of −N,
optimally used pixel searching unit that selects a group of pixels having a highest similarity from groups of pixels on image lines point-symmetric with respect to an interpolated pixel within the region by similarity calculation between increasing regions and between decreasing regions, based on the index of each adjacent pixel pair;
interpolator that determines an interpolated value using the selected group having a highest similarity.

* * * * *